United States Patent
Cai

(10) Patent No.: US 11,719,556 B2
(45) Date of Patent: Aug. 8, 2023

(54) POSITION DETECTION DEVICE, CAMERA MODULE, AND ROTARY ACTUATOR

(71) Applicant: TDK CORPORATION, Tokyo (JP)

(72) Inventor: Yongfu Cai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 407 days.

(21) Appl. No.: 17/114,664

(22) Filed: Dec. 8, 2020

(65) Prior Publication Data

US 2021/0255000 A1 Aug. 19, 2021

(30) Foreign Application Priority Data

Feb. 13, 2020 (JP) ................. 2020-022389

(51) Int. Cl.

| | |
|---|---|
| *G01D 5/16* | (2006.01) |
| *G02B 27/64* | (2006.01) |
| *G02B 7/09* | (2021.01) |
| *G03B 5/00* | (2021.01) |
| *G03B 13/36* | (2021.01) |
| *G03B 30/00* | (2021.01) |
| *H04N 5/225* | (2006.01) |
| *H04N 23/54* | (2023.01) |
| *G01D 5/14* | (2006.01) |
| *H02K 11/215* | (2016.01) |

(52) U.S. Cl.
CPC .............. *G01D 5/16* (2013.01); *G01D 5/147* (2013.01); *G03B 30/00* (2021.01); *H02K 11/215* (2016.01); *H04N 23/54* (2023.01)

(58) Field of Classification Search
CPC .... G01D 5/12–16; G02B 30/00; G03B 30/00; H02K 11/20; H02K 11/215; H02K 33/18
See application file for complete search history.

(56) References Cited

U.S. PATENT DOCUMENTS

| | | | |
|---|---|---|---|
| 2013/0043863 A1* | 2/2013 | Ausserlechner | G01R 33/022 324/207.2 |
| 2014/0021943 A1* | 1/2014 | Watanabe | G01R 33/093 324/207.21 |
| 2015/0261067 A1* | 9/2015 | Jung | G02B 7/08 348/208.1 |
| 2016/0231528 A1 | 8/2016 | Wong et al. | |
| 2019/0128698 A1* | 5/2019 | Umehara | G02B 7/08 |
| 2019/0128699 A1 | 5/2019 | Uchida et al. | |
| 2019/0277660 A1 | 9/2019 | Makino et al. | |
| 2020/0106962 A1* | 4/2020 | Smyth | G03B 13/36 |
| 2020/0300669 A1 | 9/2020 | Umehara et al. | |

FOREIGN PATENT DOCUMENTS

| | | |
|---|---|---|
| JP | S57-086418 U | 5/1982 |
| JP | 2017-103378 A | 6/2017 |

\* cited by examiner

*Primary Examiner* — Huy Q Phan
*Assistant Examiner* — David B Frederiksen
(74) *Attorney, Agent, or Firm* — Oliff PLC

(57) ABSTRACT

A position detection device includes a magnetic field generator and a magnetic sensor. The magnetic field generator is configured so that a mode of variation of a direction of a target magnetic field relative to variations in a position of a lens is such that the direction of the target magnetic field varies nonlinearly relative to the variations in the position of the lens. The magnetic sensor is configured so that a mode of variation of a detection signal relative to variations in the direction of the target magnetic field is such that the detection signal varies nonlinearly relative to the variations in the direction of the target magnetic field.

15 Claims, 14 Drawing Sheets

POSITION DETECTION DEVICE, CAMERA MODULE, AND ROTARY ACTUATOR

BACKGROUND OF THE INVENTION

1. Field of the Invention

The present invention relates to a position detection device using a magnetic sensor, a camera module using the position detection device, and a rotary actuator using the position detection device.

2. Description of the Related Art

Position detection devices using magnetic sensors have been used for a variety of applications. The position detection devices using magnetic sensors will hereinafter be referred to as magnetic position detection devices. For example, the magnetic position detection devices are used for detecting a lens position in a camera module having an autofocus mechanism incorporated in a smartphone.

US 2016/0231528 A1 discloses a technique of detecting a composite vector with a position sensor in an autofocus mechanism in which a lens is movably coupled to a substrate. The composite vector is generated by interaction between a first magnetic field having a constant strength in a first direction and a second magnetic field in a second direction generated by a magnet that moves with the lens. The second direction is orthogonal to the first direction. According to the technique, the magnitude of the second magnetic field varies depending on the lens position, and as a result, the angle that the composite vector forms with respect to the second direction (hereinafter referred to as the composite vector angle) also varies. According to the technique, the position of the lens can be detected by detecting the composite vector angle.

US 2019/0128699 A1 discloses a position detection device using a magnetoresistive element of spin valve structure. The position detection device includes a first magnetic field generation unit, a second magnetic field generation unit whose position relative to the first magnetic field generation unit is variable, and a magnetic sensor that generates a detection signal corresponding to the direction of a magnetic field to be detected. The magnetic field to be detected is a composite of a magnetic field generated by the first magnetic field generation unit and a magnetic field generated by the second magnetic field generation unit. In this position detection device, the direction and strength of the magnetic field to be detected vary when the position of the second magnetic field generation unit relative to the first magnetic field generation unit varies. According to such a position detection device, the position of the second magnetic field generation unit relative to the first magnetic field generation unit can be detected by measuring the detection signal.

As disclosed in US 2016/0231528 A1 and US 2019/0128699 A1, in a magnetic position detection device, the direction of the magnetic field to be detected by the magnetic sensor (hereinafter, referred to as a target magnetic field) varies when the position of a detection target (hereinafter, referred to as an object) of the position detection device varies. When the direction of the target magnetic field varies, the detection signal varies. The detection signal desirably varies linearly relative to variations in the position of the object. That the detection signal "varies linearly" means that the detection signal varies linearly or substantially linearly relative to variations in the position of the object in a characteristic diagram expressing the relationship between the position of the object and the detection signal. That the detection signal "varies nonlinearly" means that the detection signal does not vary linearly or substantially linearly, like varying in a curved manner, relative to variations in the position of the object in the foregoing characteristic diagram.

To make the detection signal vary linearly relative to variations in the position of the object, it is desirable for the direction of the target magnetic field to vary linearly relative to the variations in the position of the object and for the detection signal to vary linearly relative to variations in the direction of the target magnetic field. FIG. 10 of US 2019/0128699 A1 discloses that the angle that the direction of the target magnetic field forms with respect to a reference direction varies linearly relative to variations in the position of the second magnetic field generation unit relative to the first magnetic field generation unit.

In fact, because of mechanical limitations, the mode of variation of the direction of the target magnetic field relative to variations in the position of the object is sometimes forced to be such that the direction of the target magnetic field varies nonlinearly. FIG. 8B of US 2016/0231528 A1 discloses that the composite vector angle varies in a curved manner, i.e., nonlinearly relative to variations in the position of the magnet that moves with the lens. In such a case, processing for correcting the detection signal is needed since the detection signal varies nonlinearly relative to variations in the position of the object.

SUMMARY OF THE INVENTION

The present invention is directed to providing a position detection device using a magnetic sensor, wherein a detection signal can vary linearly relative to variations in the position of the object even if the direction of the target magnetic field varies nonlinearly relative to the variations in the position of the object, a camera module using the position detection device, and a rotary actuator using the position detection device.

A position detection device according to the present invention is a position detection device for detecting a position of an object whose position is variable. The position detection device according to the present invention includes a magnetic field generator that generates a target magnetic field and is configured so that a direction of the target magnetic field at a detection position in a reference plane varies when the position of the object varies, and a magnetic sensor that detects the target magnetic field and generates a detection signal corresponding to the direction of the target magnetic field.

The magnetic field generator is configured so that a mode of variation of the direction of the target magnetic field relative to variations in the position of the object is such that the direction of the target magnetic field varies nonlinearly relative to the variations in the position of the object. The magnetic sensor is configured so that a mode of variation of the detection signal relative to variations in the direction of the target magnetic field is such that the detection signal varies nonlinearly relative to the variations in the direction of the target magnetic field.

In the position detection device according to the present invention, a target angle that the direction of the target magnetic field forms with a reference direction in the reference plane may vary within a first variable range corresponding to a movable range of the position of the object. In such a case, the detection signal may vary within a second variable range corresponding to the first variable range. Moreover, in such a case, the magnetic sensor may include at least one magnetoresistive element. The at least one magnetoresistive element may include a magnetization pinned layer having a first magnetization that is parallel to the reference plane and fixed in direction, and a free layer having a second magnetization that is parallel to the reference plane and whose direction is variable according to the direction of the target magnetic field. The at least one magnetoresistive element may be each configured so that an angle that the direction of the second magnetization forms with the direction of the first magnetization when the object is located at a center of the movable range falls within a range of 0° or more and 70° or less, within a range of 110° or more and 250° or less, or within a range of 290° or more and less than 360°.

In the position detection device according to the present invention, if the magnetic sensor includes at least one magnetoresistive element, the at least one magnetoresistive element may be each configured so that the angle that the direction of the second magnetization forms with the direction of the first magnetization when the object is located at a center of the movable range falls within a range of 10° or more and 60° or less, within a range of 120° or more and 170° or less, within a range of 190° or more and 240° or less, or within a range of 300° or more and 350° or less.

In the position detection device according to the present invention, if the magnetic sensor includes at least one magnetoresistive element, the at least one magnetoresistive element may include at least one first magnetoresistive element and at least one second magnetoresistive element. The magnetic sensor may further include a resistor having a predetermined resistance value, a power supply port to which a predetermined voltage is applied, a ground port that is connected to a ground, and an output port. In such a case, the at least one first magnetoresistive element is located between the power supply port and the output port. The at least one second magnetoresistive element is located between the output port and the ground port.

The resistor may be either connected in series to the at least one first magnetoresistive element so that the resistor is located between the power supply port and the output port, or connected in series to the at least one second magnetoresistive element so that the resistor is located between the output port and the ground port. The direction of the first magnetization of the magnetization pinned layer in each of the at least one first magnetoresistive element is a first direction. The direction of the first magnetization of the magnetization pinned layer in each of the at least one second magnetoresistive element is a second direction opposite to the first direction. The detection signal depends on a potential of the output port.

In the position detection device according to the present invention, if the magnetic sensor includes at least one magnetoresistive element, the at least one magnetoresistive element may include at least one first magnetoresistive element, at least one second magnetoresistive element, at least one third magnetoresistive element, and at least one fourth magnetoresistive element. The magnetic sensor may further include a first resistor and a second resistor each having a predetermined resistance value, a power supply port to which a predetermined voltage is applied, a ground port that is connected to a ground, a first output port, and a second output port. In such a case, the at least one first magnetoresistive element is located between the power supply port and the first output port. The at least one second magnetoresistive element is located between the first output port and the ground port. The at least one third magnetoresistive element is located between the power supply port and the second output port. The at least one fourth magnetoresistive element is located between the second output port and the ground port.

The first and second resistors may be provided either such that the first resistor is connected in series to the at least one first magnetoresistive element so that the first resistor is located between the power supply port and the first output port and the second resistor is connected in series to the at least one fourth magnetoresistive element so that the second resistor is located between the second output port and the ground port, or such that the first resistor is connected in series to the at least one second magnetoresistive element so that the first resistor is located between the first output port and the ground port and the second resistor is connected in series to the at least one third magnetoresistive element so that the second resistor is located between the power supply port and the second output port. The direction of the first magnetization of the magnetization pinned layer in each of the at least one first magnetoresistive element and the direction of the first magnetization of the magnetization pinned layer in each of the at least one fourth magnetoresistive element are a first direction. The direction of the first magnetization of the magnetization pinned layer in each of the at least one second magnetoresistive element and the direction of the first magnetization of the magnetization pinned layer in each of the at least one third magnetoresistive element are a second direction opposite to the first direction. The detection signal depends on a potential difference between the first and second output ports.

In the position detection device according to the present invention, the position of the object may vary in a linear direction. In such a case, the magnetic field generator may include a first magnetic field generation unit that generates a first magnetic field and a second magnetic field generation unit that generates a second magnetic field. A position of the second magnetic field generation unit relative to the first magnetic field generation unit may vary as the position of the object varies. The first and second magnetic field generation units may be configured so that a strength and a direction of a first magnetic field component and a direction of a second magnetic field component do not vary and a strength of the second magnetic field component varies when the position of the second magnetic field generation unit relative to the first magnetic field generation unit varies. Here, the first magnetic field component is a component of the first magnetic field parallel to the reference plane at the detection position. The second magnetic field component is a component of the second magnetic field parallel to the reference plane at the detection position. The target magnetic field may be a composite of the first and second magnetic field components.

If the magnetic field generator includes the first and second magnetic field generation units, the first magnetic field generation unit may include two magnets disposed at different positions. The first magnetic field is a composite of two magnetic fields that are generated by the two magnets, respectively. In such a case, the position detection device according to the present invention may further include a first holding member for holding the first magnetic field generation unit, and a second holding member for holding the second magnetic field generation unit. The second holding member is provided such that its position is variable in one direction relative to the first holding member.

If the position detection device according to the present invention includes the first and second holding members, the object may be a lens. The second holding member may hold the lens and be provided such that its position is variable in an optical axis direction of the lens relative to the first holding member.

In the position detection device according to the present invention, the object may be a rotating body whose position varies in a direction of rotation about a center axis. In such a case, the magnetic field generator may be connected to the rotating body.

A camera module according to the present invention includes a lens whose position is variable in a linear direction, a position detection device for detecting the position of the lens, a holding member that holds the lens, and a driving device that moves the holding member. The position detection device includes a magnetic field generator that generates a target magnetic field and is configured so that a direction of the target magnetic field at a detection position in a reference plane varies when the position of the lens varies, and a magnetic sensor that detects the target magnetic field and generates a detection signal corresponding to the direction of the target magnetic field. The magnetic field generator is configured so that a mode of variation of the direction of the target magnetic field relative to variations in the position of the lens is such that the direction of the target magnetic field varies nonlinearly relative to the variations in the position of the lens. The magnetic sensor is configured so that a mode of variation of the detection signal relative to variations in the direction of the target magnetic field is such that the detection signal varies nonlinearly relative to the variations in the direction of the target magnetic field.

A rotary actuator according to the present invention includes a rotating body whose position is variable in a direction of rotation about a center axis, a position detection device for detecting the position of the rotating body, and a driving device that rotates the rotating body. The position detection device includes a magnetic field generator that generates a target magnetic field and is configured so that a direction of the target magnetic field at a detection position in a reference plane varies when the position of the rotating body varies, and a magnetic sensor that detects the target magnetic field and generates a detection signal corresponding to the direction of the target magnetic field. The magnetic field generator is configured so that a mode of variation of the direction of the target magnetic field relative to variations in the position of the rotating body is such that the direction of the target magnetic field varies nonlinearly relative to the variations in the position of the rotating body. The magnetic sensor is configured so that a mode of variation of the detection signal relative to variations in the direction of the target magnetic field is such that the detection signal varies nonlinearly relative to the variations in the direction of the target magnetic field.

In the position detection device, the camera module, and the rotary actuator according to the present invention, the magnetic field generator is configured so that the mode of variation of the direction of the target magnetic field relative to variations in the position of the object is such that the direction of the target magnetic field varies nonlinearly relative to the variations in the position of the object. The magnetic sensor is configured so that the mode of variation of the detection signal relative to variations in the direction of the target magnetic field is such that the detection signal varies nonlinearly relative to the variations in the direction of the target magnetic field. The position detection device according to the present invention thereby enables linear variation of the detection signal relative to variations in the position of the object even if the direction of the target magnetic field varies nonlinearly relative to the variations in the position of the object. Similarly, the camera module according to the present invention thereby enables linear variation of the detection signal relative to variations in the position of the lens even if the direction of the target magnetic field varies nonlinearly relative to the variations in the position of the lens. Similarly, the rotary actuator according to the present invention thereby enables linear variation of the detection signal relative to variations in the position of the rotating body even if the direction of the target magnetic field varies nonlinearly relative to the variations in the position of the rotating body.

Other and further objects, features and advantages of the present invention will appear more fully from the following description.

DETAILED DESCRIPTION OF THE PREFERRED EMBODIMENTS

First Embodiment

Figure 1:
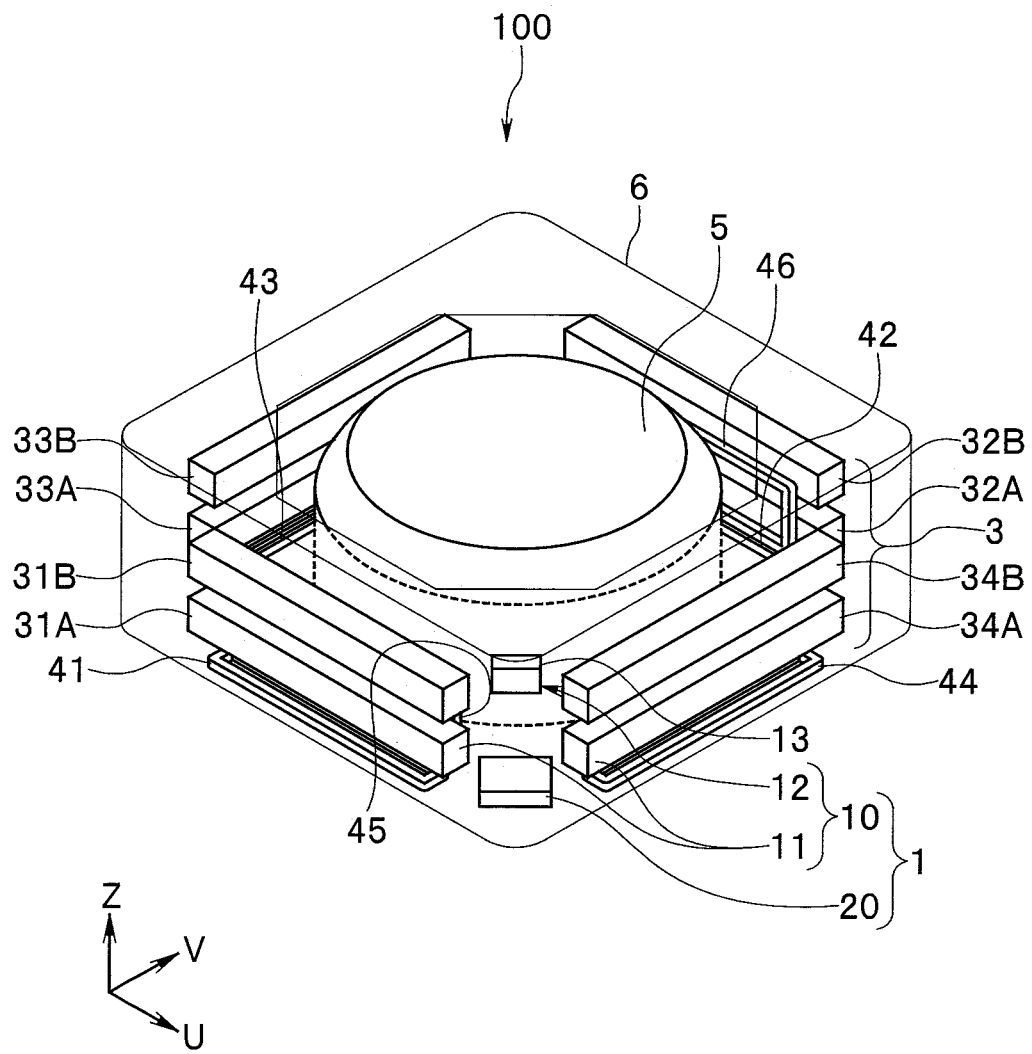
FIG. 1 is a perspective view of a camera module according to a first embodiment of the invention.
Figure 2:
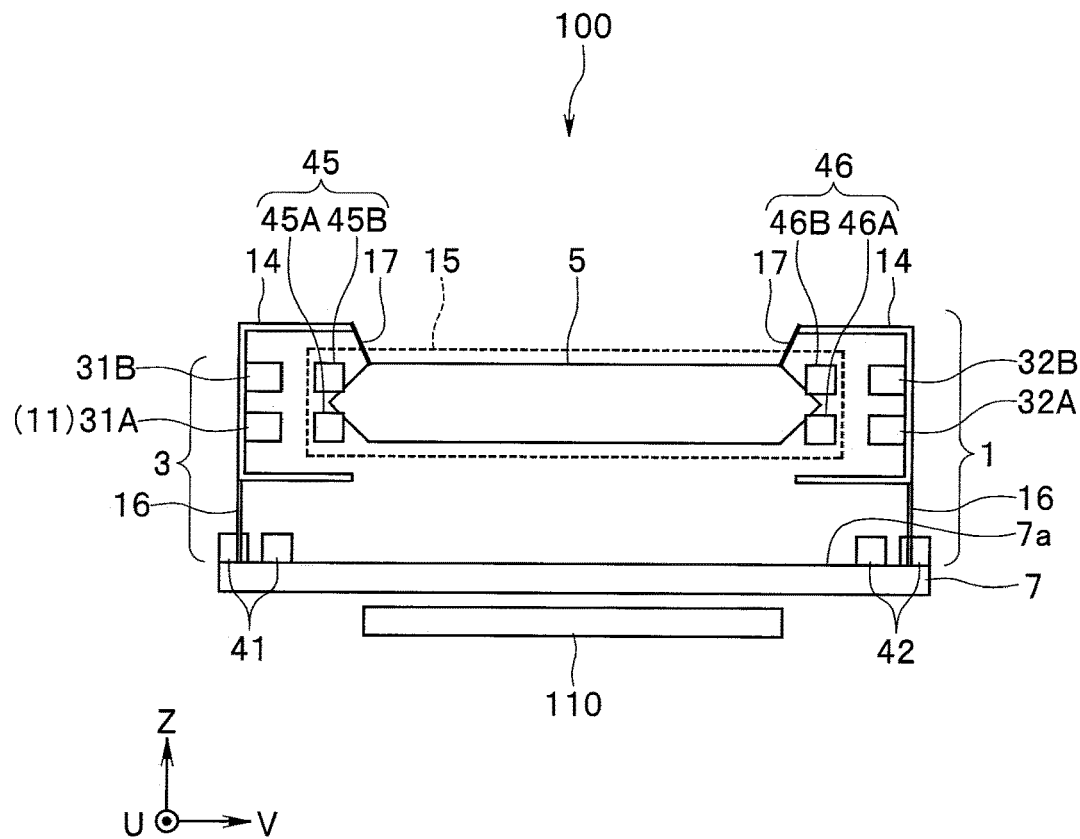
FIG. 2 illustrates an internal schematic view of the camera module according to the first embodiment of the invention.

Preferred embodiments of the present invention will now be described in detail with reference to the drawings. First, reference is made to FIG. 1 and FIG. 2 to describe the configuration of a camera module according to the first embodiment of the invention. FIG. 1 is a perspective view of the camera module 100. FIG. 2 is a schematic internal view of the camera module 100. For ease of understanding, in FIG. 2 the parts of the cameral module 100 are drawn on a different scale and in a different layout than those in FIG. 1. The camera module 100 according to the present embodiment constitutes, for example, a portion of a camera for a smartphone having an optical image stabilization mechanism and an autofocus mechanism, and is used in combination with an image sensor 110 that uses CMOS or other similar techniques.

The camera module 100 according to the present embodiment includes a position detection device 1 according to the present embodiment, and a driving device 3, a lens 5, a housing 6 and a substrate 7. The position detection device 1 according to the present embodiment is a magnetic position detection device, and is used to detect the position of the lens 5 during automatic focusing. The driving device 3 is to move the lens 5. The housing 6 is to protect the position detection device 1 and the driving device 3. The substrate 7 has a top surface 7a. FIG. 1 omits the illustration of the substrate 7, and FIG. 2 omits the illustration of the housing 6.

Now, we define U, V, and Z directions as shown in FIGS. 1 and 2. The U, V, and Z directions are orthogonal to one another. In the present embodiment, the Z direction is a direction perpendicular to the top surface 7a of the substrate 7. In FIG. 2 the Z direction is the upward direction. The U and V directions are both parallel to the top surface 7a of the substrate 7. The opposite directions to the U, V, and Z directions will be referred to as —U, —V, and —Z directions, respectively. As used herein, the term □above□refers to positions located forward of a reference position in the Z direction, and □below□refers to positions located on a side of the reference position opposite from □above□.

The lens 5 is disposed above the top surface 7a of the substrate 7 in such an orientation that the direction of its optical axis is parallel to the Z direction. The substrate 7 has an opening (not illustrated) for passing light that has passed through the lens 5. As shown in FIG. 2, the camera module 100 is in alignment with the image sensor 110 so that light that has passed through the lens 5 and the non-illustrated opening will enter the image sensor 110.

Figure 3:
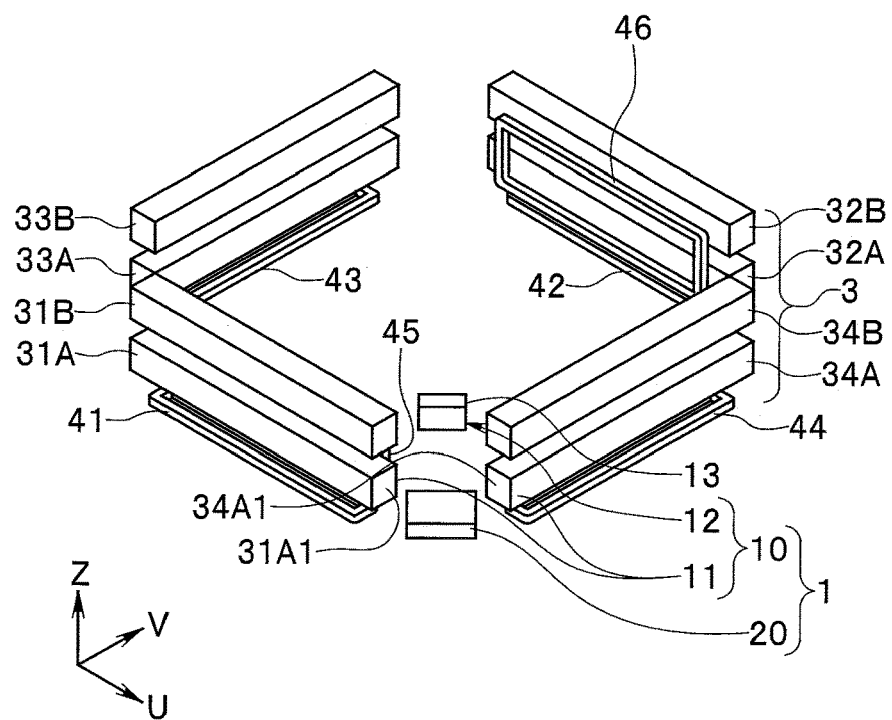
FIG. 3 is a perspective view of the position detection device and a driving device according to the first embodiment of the invention.
Figure 4:
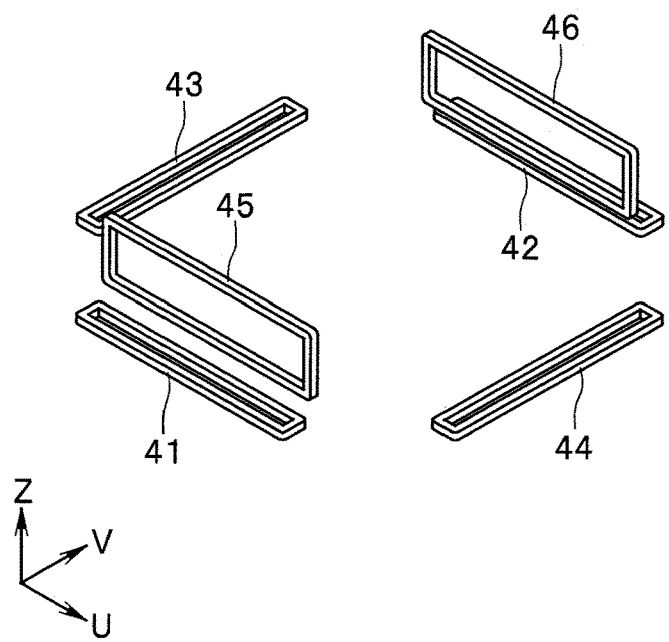
FIG. 4 is a perspective view of a plurality of coils of the driving device of FIG. 1.
Figure 5:
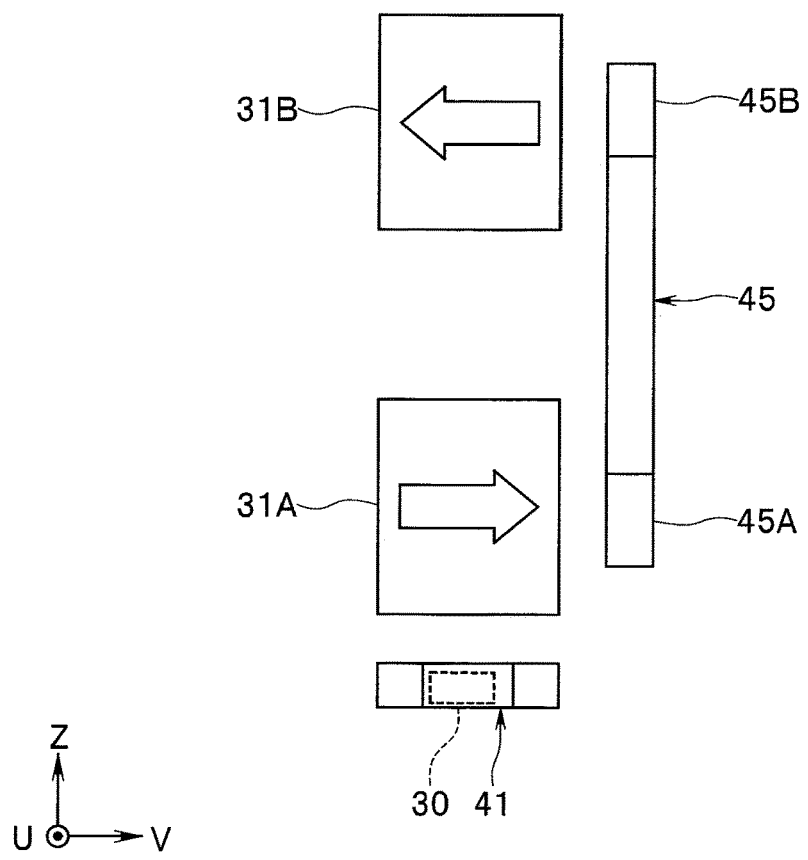
FIG. 5 is a side view illustrating the principal parts of the driving device of FIG. 1.

The position detection device 1 and the driving device 3 according to the present embodiment will now be described in detail with reference to FIG. 2 to FIG. 5. FIG. 3 is a perspective view of the position detection device 1 and the driving device 3. FIG. 4 is a perspective view of a plurality of coils of the driving device 3. FIG. 5 is a side view illustrating the principal parts of the driving device 3.

The position detection device 1 includes a first holding member 14, a second holding member 15, a plurality of first wires 16, and a plurality of second wires 17. The second holding member 15 is to hold the lens 5. Although not illustrated, the second holding member 15 is shaped like, for example, a hollow cylinder so that the lens 5 is insertable in the hollow.

The second holding member 15 is provided such that its position is variable in one direction, specifically, in the direction of the optical axis of the lens 5, i.e., a direction parallel to the Z direction, relative to the first holding member 14. In the present embodiment, the first holding member 14 is shaped like a box so that the lens 5 and the second holding member 15 can be accommodated therein. The plurality of second wires 17 connect the first and second holding members 14 and 15, and support the second holding member 15 such that the second holding member 15 is movable in a direction parallel to the Z direction relative to the first holding member 14.

The first holding member 14 is provided above the top surface 7a of the substrate 7 such that its position is variable relative to the substrate 7 in a direction parallel to the U direction and in a direction parallel to the V direction. The plurality of first wires 16 connect the substrate 7 and the first holding member 14, and support the first holding member 14 such that the first holding member 14 is movable relative to the substrate 7 in a direction parallel to the U direction and in a direction parallel to the V direction. When the position of the first holding member 14 relative to the substrate 7 varies, the position of the second holding member 15 relative to the substrate 7 also varies.

The driving device 3 includes magnets 31A, 31B, 32A, 32B, 33A, 33B, 34A and 34B, and coils 41, 42, 43, 44, 45 and 46. The magnet 31A is located forward of the lens 5 in the —V direction. The magnet 32A is located forward of the lens 5 in the V direction. The magnet 33A is located forward of the lens 5 in the —U direction. The magnet 34A is located forward of the lens 5 in the U direction. The magnets 31B, 32B, 33B and 34B are located above the magnets 31A, 32A, 33A and 34A, respectively. The magnets 31A, 31B, 32A, 32B, 33A, 33B, 34A and 34B are fixed to the first holding member 14.

As shown in FIG. 3, the magnets 31A, 31B, 32A and 32B are each in the shape of a rectangular solid that is long in the U direction. The magnets 33A, 33B, 34A and 34B are each in the shape of a rectangular solid that is long in the V direction. The magnets 31A and 32B are magnetized in the V direction. The magnets 31B and 32A are magnetized in the —V direction. The magnets 33A and 34B are magnetized in the U direction. The magnets 33B and 34A are magnetized in the —U direction. In FIG. 5, the arrows drawn inside the magnets 31A and 31B indicate the magnetization directions of the magnets 31A and 31B.

The coil 41 is located between the magnet 31A and the substrate 7. The coil 42 is located between the magnet 32A and the substrate 7. The coil 43 is located between the magnet 33A and the substrate 7. The coil 44 is located between the magnet 34A and the substrate 7. The coil 45 is located between the lens 5 and the magnets 31A and 31B. The coil 46 is located between the lens 5 and the magnets 32A and 32B. The coils 41, 42, 43 and 44 are fixed to the substrate 7. The coils 45 and 46 are fixed to the second holding member 15.

The coil 41 is subjected mainly to a magnetic field generated by the magnet 31A. The coil 42 is subjected mainly to a magnetic field generated by the magnet 32A. The coil 43 is subjected mainly to a magnetic field generated by the magnet 33A. The coil 44 is subjected mainly to a magnetic field generated by the magnet 34A.

As shown in FIGS. 2, 4 and 5, the coil 45 includes a first conductor portion 45A extending along the magnet 31A in the U direction, a second conductor portion 45B extending along the magnet 31B in the U direction, and two third conductor portions connecting the first and second conductor portions 45A and 45B. As shown in FIGS. 2 and 4, the coil 46 includes a first conductor portion 46A extending along the magnet 32A in the U direction, a second conductor portion 46B extending along the magnet 32B in the U direction, and two third conductor portions connecting the first and second conductor portions 46A and 46B.

The first conductor portion 45A of the coil 45 is subjected mainly to a component in the V direction of the magnetic field generated by the magnet 31A. The second conductor portion 45B of the coil 45 is subjected mainly to a component in the –V direction of a magnetic field generated by the magnet 31B. The first conductor portion 46A of the coil 46 is subjected mainly to a component in the –V direction of the magnetic field generated by the magnet 32A. The second conductor portion 46B of the coil 46 is subjected mainly to a component in the V direction of a magnetic field generated by the magnet 32B.

The position detection device 1 further includes a magnetic field generator 10 and a magnetic sensor 20. The magnetic field generator 10 generates a target magnetic field MF that is a magnetic field for the magnetic sensor 20 to detect (magnetic field to be detected). In the present embodiment, the magnetic field generator 10 includes a first magnetic field generation unit 11 that generates a first magnetic field and a second magnetic field generation unit 12 that generates a second magnetic field. In the present embodiment, the first magnetic field generation unit 11 has two magnets disposed at different positions. In the present embodiment, specifically, the first magnetic field generation unit 11 has the magnets 31A and 34A as the aforementioned two magnets. The first magnetic field is a composite of the magnetic fields generated by the magnets 31A and 34A. As mentioned above, the magnets 31A and 34A are fixed to the first holding member 14. The first magnetic field generation unit 11 is thus held by the first holding member 14.

As shown in FIG. 3, the magnet 31A has an end face 31A1 located at the end of the magnet 31A in the U direction. The magnet 34A has an end face 34A1 located at the end of the magnet 34A in the —V direction.

The second magnetic field generation unit 12 is provided such that its position relative to the first magnetic field generation unit 11 is variable. In the present embodiment, the second magnetic field generation unit 12 has a magnet 13. The second magnetic field is a magnetic field generated by the magnet 13. The magnet 13 is in the shape of a rectangular solid. The magnet 13 is fixed to the second holding member 15 in a space near the end face 31A1 of the magnet 31A and the end face 34A1 of the magnet 34A. The second magnetic field generation unit 12 is thus held by the second holding member 15. When the position of the second holding member 15 relative to the first holding member 14 varies in a direction parallel to the Z direction, the position of the second magnetic field generation unit 12 relative to the first magnetic field generation unit 11 also varies in the direction parallel to the Z direction.

The magnetic sensor 20 includes at least one magnetoresistive (MR) element. The magnetic sensor 20 detects a target magnetic field MF at a detection position in a reference plane, and generates a detection signal corresponding to the direction of the target magnetic field MF. The magnetic sensor 20 is fixed to the substrate 7 in the vicinity of the end face 31A1 of the magnet 31A and the end face 34A1 of the magnet 34A. The distance between the magnet 31A and the magnetic sensor 20 is equal to the distance between the magnet 34A and the magnetic sensor 20. The magnet 13 is located above the magnetic sensor 20.

The detection position is a position at which the magnetic sensor 20 detects the first magnetic field and the second magnetic field. In the present embodiment, the reference plane is a plane that contains the detection position and is perpendicular to the Z direction. When the position of the second magnetic field generation unit 12 relative to the first magnetic field generation unit 11 varies, the distance between the detection position and the second magnetic field generation unit 12 varies.

Figure 6:
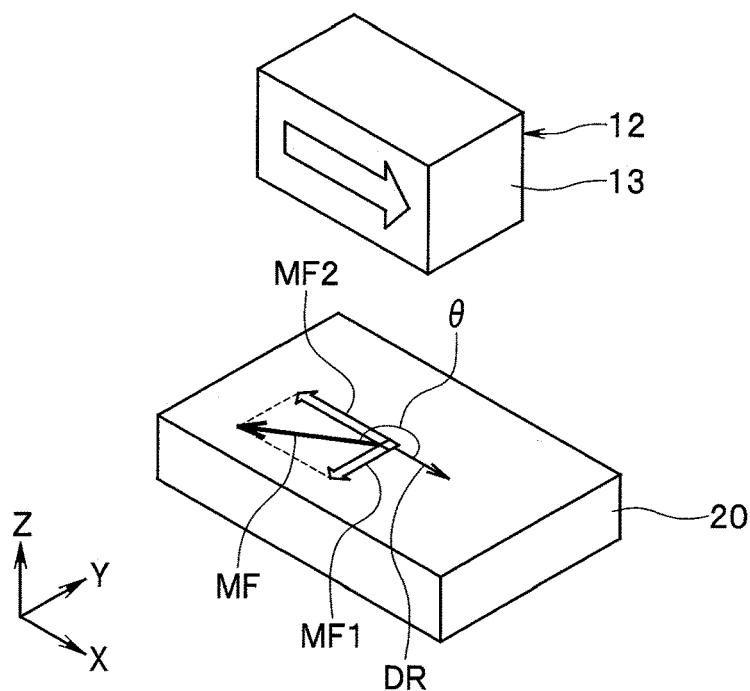
FIG. 6 is a perspective view illustrating the principal parts of the position detection device according to the first embodiment of the invention.

A component of the first magnetic field at the detection position, the component being parallel to the reference plane, will be referred to the first magnetic field component MF1. A component of the second magnetic field at the detection position, the component being parallel to the reference plane, will be referred to as the second magnetic field component MF2. The target magnetic field MF is a composite of the first magnetic field component MF1 and the second magnetic field component MF2. The first and second magnetic field components MF1 and MF2 and the target magnetic field MF are shown in FIG. 6 to be described later.

The positional relationships among the first magnetic field generation unit 11, the second magnetic field generation unit 12 and the magnetic sensor 20, and the configuration of the magnetic sensor 20 will be described in more detail later.

The driving device 3 further includes a magnetic sensor 30 disposed on the inner side of one of the coils 41 and 42 and fixed to the substrate 7, and a magnetic sensor 30 disposed on the inner side of one of the coils 43 and 44 and fixed to the substrate 7. Assume here that the two magnetic sensors 30 are disposed on the inner sides of the coils 41 and 44, respectively. As will be described later, the two magnetic sensors 30 are used to vary the position of the lens 5 to reduce the effect of hand-induced camera shake.

The magnetic sensor 30 disposed on the inner side of the coil 41 detects the magnetic field generated by the magnet 31A and generates a signal corresponding to the position of the magnet 31A. The magnetic sensor 30 disposed on the inner side of the coil 44 detects the magnetic field generated by the magnet 34A and generates a signal corresponding to the position of the magnet 34A. For example, the magnetic sensors 30 are constructed of elements for detecting magnetic fields, such as Hall elements.

The positional relationships among the first magnetic field generation unit 11, the second magnetic field generation unit 12, and the magnetic sensor 20 will now be described in detail with reference to FIGS. 3 and 6. FIG. 6 is a perspective view illustrating the principal parts of the position detection device 1. Here, X and Y directions are defined as shown in FIG. 6. Both the X and Y directions are parallel to the top surface 7a (see FIG. 2) of the substrate 7. The X direction is the direction rotated by 45° from the U direction toward the V direction. The Y direction is the direction rotated by 45° from the V direction toward the −U direction. The opposite directions to the X and Y directions will be referred to as −X and −Y directions, respectively.

In FIG. 6, the arrow labeled MF1 represents the first magnetic field component MF1. In the present embodiment, the first magnetic field generation unit 11 and the magnetic sensor 20 are provided to orient the first magnetic field component MF1 in the —Y direction. The direction of the first magnetic field component MF1 is adjustable by adjusting, for example, the positional relationships of the magnets 31A and 34A with respect to the magnetic sensor 20 and the orientations of the magnets 31A and 34A. The magnets 31A and 34A are preferably placed to be symmetric with respect to a YZ plane that contains the detection position.

In FIG. 6, the arrow labeled MF2 represents the second magnetic field component MF2, and the arrow drawn inside the magnet 13 indicates the magnetization direction of the magnet 13. The direction of the second magnetic field component MF2 is different from the direction of the first magnetic field component MF1. The direction of the target magnetic field MF is different from both of the directions of the first and second magnetic field components MF1 and MF2, and is between those directions. The variable range of the direction of the target magnetic field MF is below 180°. In the present embodiment, specifically, the second magnetic field component MF2 is in the −X direction orthogonal to the direction of the first magnetic field component MF1. In this case, the variable range of the direction of the target magnetic field MF is below 90°.

Figure 7:
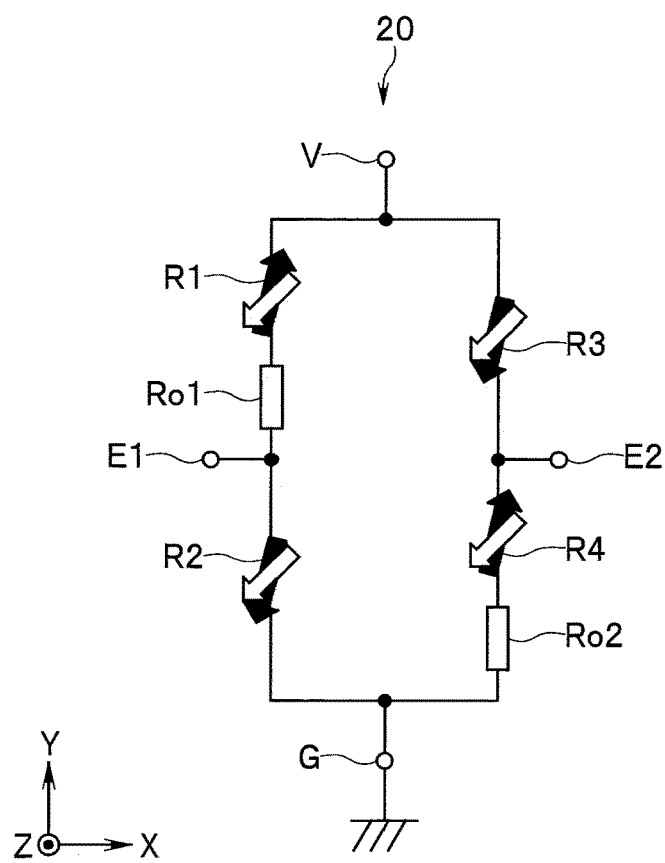
FIG. 7 is a circuit diagram illustrating the configuration of a magnetic sensor of the first embodiment of the invention.

An example of configuration of the magnetic sensor 20 will now be described with reference to FIG. 7. FIG. 7 is a circuit diagram illustrating the configuration of the magnetic sensor 20. In the present embodiment, the magnetic sensor 20 is configured to generate, as a detection signal corresponding to the direction of the target magnetic field MF, a detection signal corresponding to an angle that the direction of the target magnetic field MF forms with a reference direction. In the present embodiment the reference direction is the X direction.

As illustrated in FIG. 7, the magnetic sensor 20 includes a power supply port V to which a predetermined voltage is applied, a ground port G that is connected to a ground, a first output port E1, a second output port E2, a first resistor section R1, a second resistor section R2, a third resistor section R3, and a fourth resistor section R4. The first resistor section R1 is provided between the power supply port V and the first output port E1. The second resistor section R2 is provided between the first output port E1 and the ground port G The third resistor section R3 is provided between the power supply port V and the second output port E2. The fourth resistor section R4 is provided between the second output port E2 and the ground port G.

The first resistor section R1 includes at least one first MR element. The second resistor section R2 includes at least one second MR element. The third resistor section R3 includes at least one third MR element. The fourth resistor section R4 includes at least one fourth MR element.

In the present embodiment, specifically, the first resistor section R1 includes a plurality of first MR elements connected in series, the second resistor section R2 includes a plurality of second MR elements connected in series, the third resistor section R3 includes a plurality of third MR elements connected in series, and the fourth resistor section R4 includes a plurality of fourth MR elements connected in series.

The magnetic sensor 20 further includes a first resistor Ro1 and a second resistor Ro2 each having a predetermined resistance value. The first resistor Ro1 is connected in series to the at least one first MR element so that the first resistor Ro1 is located between the power supply port V and the first output port E1. The second resistor Ro2 is connected in series to the at least one fourth MR element so that the second resistor Ro2 is located between the second output port E2 and the ground port G In the example illustrated in FIG. 7, the first resistor Ro1 is located between the first resistor section R1 and the first output port E1. The second resistor Ro2 is located between the fourth resistor section R4 and the ground port G. Each of the plurality of MR elements included in the magnetic sensor 20 is a spin-valve MR element. The spin-valve MR element includes a magnetization pinned layer, a free layer, and a gap layer. The magnetization pinned layer has a first magnetization that is parallel to the reference plane and fixed in direction. The free layer has a second magnetization that is parallel to the reference plane and that can vary in direction according to the direction of the target magnetic field MF. The gap layer is located between the magnetization pinned layer and the free layer. The spin-valve MR element may be a tunneling magnetoresistive (TMR) element or a giant magnetoresistive (GMR) element. In the TMR element, the gap layer is a tunnel barrier layer. In the GMR element, the gap layer is a nonmagnetic conductive layer. The spin-valve MR element varies in resistance value according to the angle that the second magnetization direction of the free layer forms with the first magnetization direction of the magnetization pinned layer, and has a minimum resistance value when the foregoing angle is 0° and a maximum resistance value when the foregoing angle is 180°. In FIG. 7, the filled arrows indicate the magnetization directions of the magnetization pinned layers of the MR elements, and the hollow arrows indicate the magnetization directions of the free layers of the MR elements.

The first magnetization directions of the magnetization pinned layers in the plurality of MR elements included in the first and fourth resistor sections R1 and R4 are in a first direction. The first magnetization directions of the magnetization pinned layers in the plurality of MR elements included in the second and third resistor sections R2 and R3 are in a second direction opposite to the first direction.

In the light of the production accuracy of the MR elements and other factors, the first magnetization directions of the magnetization pinned layers of the plurality of MR elements in the first to fourth resistor sections R1, R2, R3 and R4 may be slightly different from the above-described directions.

The electric potential at the output port E1, the electric potential at the output port E2, and the potential difference between the output ports E1 and E2 vary according to the cosine of the angle that the direction of the target magnetic field MF forms with the first direction. The magnetic sensor 20 outputs a signal corresponding to the potential difference between the output ports E1 and E2 as a detection signal. The detection signal depends on the electric potential at the output port E1, the electric potential at the output port E2, and the potential difference between the output ports E1 and E2. The detection signal varies according to the direction of the target magnetic field MF, and therefore corresponds to the direction of the target magnetic field MF.

The magnetic sensor 20 may further include a non-illustrated differential detector. The non-illustrated differential detector outputs a signal corresponding to the potential difference between the output ports E1 and E2 as the detection signal.

Figure 8:
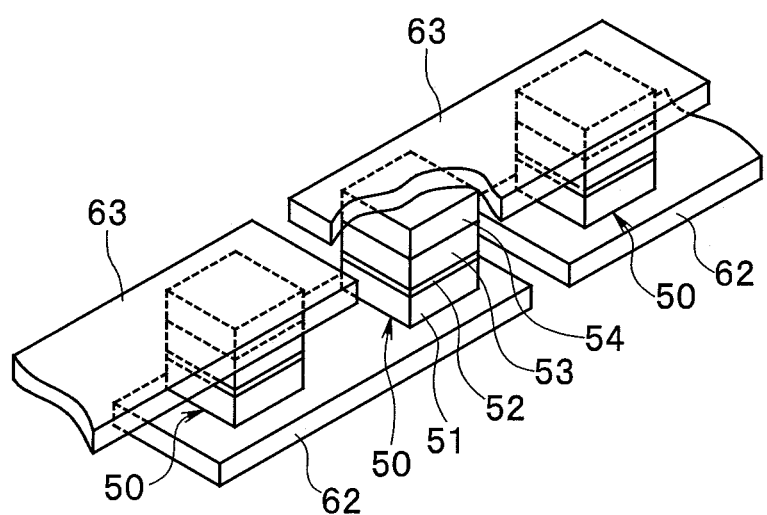
FIG. 8 is a perspective view of a portion of a resistor section in FIG. 7.

An example of the configuration of the resistor sections R1, R2, R3 and R4 will now be described with reference to FIG. 8. FIG. 8 is a perspective view illustrating a portion of one of the resistor sections R1, R2, R3 and R4. In this example, the resistor section includes a plurality of lower electrodes 62, a plurality of MR elements 50 and a plurality of upper electrodes 63. The plurality of lower electrodes 62 are arranged on a substrate (not illustrated). Each of the lower electrodes 62 has a long slender shape. Every two lower electrodes 62 that are adjacent to each other in the longitudinal direction of the lower electrodes 62 have a gap therebetween. As shown in FIG. 8, MR elements 50 are provided on the top surfaces of the lower electrodes 62, near opposite ends in the longitudinal direction. Each of the MR elements 50 includes a free layer 51, a gap layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to fix the magnetization direction of the magnetization pinned layer 53. The plurality of upper electrodes 63 are arranged over the plurality of MR elements 50. Each of the upper electrodes 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, in the resistor section shown in FIG. 8 the plurality of MR elements 50 are connected in series by the plurality of lower electrodes 62 and the plurality of upper electrodes 63.

It should be appreciated that the layers 51 to 54 of each MR element 50 may be stacked in the reverse order to that shown in FIG. 8. Each MR element 50 may also be configured without the antiferromagnetic layer 54. Such a configuration may include, for example, a magnetization pinned layer of an artificial antiferromagnetic structure, which includes two ferromagnetic layers and a nonmagnetic metal layer interposed between the two ferromagnetic layers, in place of the antiferromagnetic layer 54 and the magnetization pinned layer 53.

Reference is now made to FIG. 2 to FIG. 5 to describe the operation of the driving device 3. The driving device 3 constitutes part of optical image stabilization and autofocus mechanisms. Such mechanisms will be briefly described first. A control unit (not illustrated) external to the camera module 100 controls the driving device 3, the optical image stabilization mechanism, and the autofocus mechanism.

The optical image stabilization mechanism is configured to detect hand-induced camera shake using, for example, a gyrosensor external to the camera module 100. Upon detection of hand-induced camera shake by the optical image stabilization mechanism, the non-illustrated control unit controls the driving device 3 so as to vary the position of the lens 5 relative to the substrate 7 depending on the mode of the camera shake. This stabilizes the absolute position of the lens 5 to reduce the effect of the camera shake. The position of the lens 5 relative to the substrate 7 is varied in a direction parallel to the U direction or in a direction parallel to the V direction, depending on the mode of the camera shake.

The autofocus mechanism is configured to detect a state in which focus is achieved on the subject, using, for example, an image sensor 110 or an autofocus sensor. Using the driving device 3, the non-illustrated control unit varies the position of the lens 5 relative to the substrate 7 in a direction parallel to the Z direction so as to achieve focus on the subject. This enables automatic focusing on the subject.

Next, a description will be given of the operation of the driving device 3 related to the optical image stabilization mechanism. When currents are passed through the coils 41 and 42 by the non-illustrated control unit, the first holding member 14 with the magnets 31A and 32A fixed thereto moves in a direction parallel to the V direction due to interaction between the magnetic fields generated by the magnets 31A and 32A and the magnetic fields generated by the coils 41 and 42. As a result, the lens 5 also moves in the direction parallel to the V direction. On the other hand, when currents are passed through the coils 43 and 44 by the non-illustrated control unit, the first holding member 14 with the magnets 33A and 34A fixed thereto moves in a direction parallel to the U direction due to interaction between the magnetic fields generated by the magnets 33A and 34A and the magnetic fields generated by the coils 43 and 44. As a result, the lens 5 also moves in the direction parallel to the U direction. The non-illustrated control unit detects the position of the lens 5 by measuring signals corresponding to the positions of the magnets 31A and 34A, which are generated by the two magnetic sensors 30.

Next, the operation of the driving device 3 related to the autofocus mechanism will be described. To move the position of the lens 5 relative to the substrate 7 in the Z direction, the non-illustrated control unit passes a current through the coil 45 such that the current flows through the first conductor portion 45A in the U direction and flows through the second conductor portion 45B in the —U direction, and passes a current through the coil 46 such that the current flows through the first conductor portion 46A in the —U direction and flows through the second conductor portion 46B in the U direction. These currents and the magnetic fields generated by the magnets 31A, 31B, 32A and 32B cause a Lorentz force in the Z direction to be exerted on the first and second conductor portions 45A and 45B of the coil 45 and the first and second conductor portions 46A and 46B of the coil 46. This causes the second holding member 15 with the coils 45 and 46 fixed thereto to move in the Z direction. As a result, the lens 5 also moves in the Z direction.

To move the position of the lens 5 relative to the substrate 7 in the —Z direction, the non-illustrated control unit passes currents through the coils 45 and 46 in directions opposite to those in the case of moving the position of the lens 5 relative to the substrate 7 in the Z direction.

The function and effects of the position detection device 1 according to the present embodiment will now be described. The position detection device 1 is used to detect the position of an object whose position is variable. In the present embodiment, the object is the lens 5 whose position varies in a linear direction. The position detection device 1 according to the present embodiment is used to detect the position of the lens 5.

The magnetic field generator 10 is configured so that the direction of the target magnetic field MF at the detection position in the reference plane varies when the position of the object, i.e., the lens 5 varies. In the present embodiment, the magnetic field generator 10 includes the first and second magnetic field generation units 11 and 12. When the position of the lens 5 relative to the substrate 7 varies, the position of the second holding member 15 also varies relative to each of the substrate 7 and the first holding member 14. As previously mentioned, the first holding member 14 holds the first magnetic field generation unit 11, and the second holding member 15 holds the second magnetic field generation unit 12. Accordingly, when the position of the lens 5 relative to the substrate 7 varies as mentioned above, the position of the second magnetic field generation unit 12 relative to the first magnetic field generation unit 11 varies. Hereinafter, the position of the second magnetic field generation unit 12 relative to the first magnetic field generation unit 11 will be referred to as the relative position and denoted by the symbol PR. In the present embodiment, the relative position is variable in a direction of the optical axis of the lens 5, that is, in a direction parallel to the Z direction.

When the relative position varies, the position of the second magnetic field generation unit 12 relative to the substrate 7 varies whereas the position of the first magnetic field generation unit 11 relative to the substrate 7 does not vary. Accordingly, when the relative position varies, the strength of the second magnetic field component MF2 varies whereas none of the strength and direction of the first magnetic field component MF1 and the direction of the second magnetic field component MF2 vary. When the strength of the second magnetic field component MF2 varies, the direction and strength of the target magnetic field MF vary, and accordingly, the value of the detection signal to be generated by the magnetic sensor 20 also varies. The value of the detection signal varies according to the relative position. The non-illustrated control unit detects the relative position by measuring the detection signal. The direction and magnitude of variation in the position of the lens 5 relative to the substrate 7 are the same as those of variation in the relative position. The relative position can thus be said to represent the position of the lens 5, or more specifically, the position of the lens 5 relative to the substrate 7.

In the present embodiment, the distance between the detection position when the second magnetic field generation unit 12 is closest to the detection position and the second magnetic field generation unit 12 will be referred to as a shortest distance. The relative position is expressed by a value obtained by subtracting the shortest distance from the distance between the second magnetic field generation unit 12 located at a given position and the detection position. Moreover, the angle that the direction of the target magnetic field MF forms with the reference direction, i.e., the X direction will be referred to as a target angle and denoted by the symbol $\theta$. FIG. 6 illustrates the target angle $\theta$. In FIG. 6, the arrow denoted by the symbol DR represents the reference direction. The target angle $\theta$ indicates the direction of the target magnetic field MF. In the present embodiment, the magnetic sensor 20 generates a detection signal corresponding to the target angle $\theta$.

Figure 9:
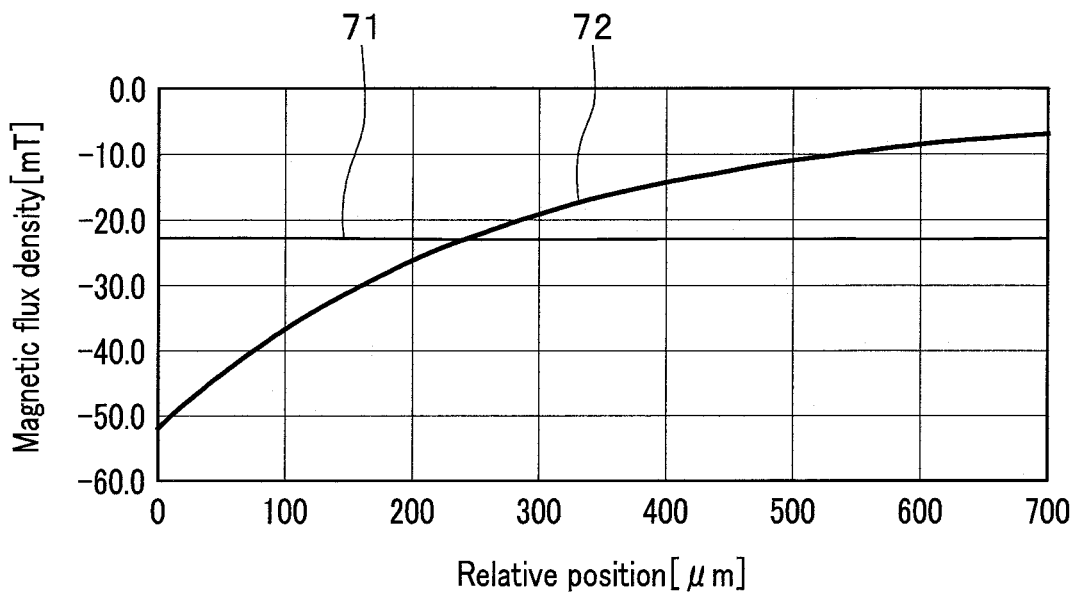
FIG. 9 is a characteristic diagram illustrating the relationship between a relative position and first and second magnetic field components in the first embodiment of the invention.

A relationship between the relative position and the target angle $\theta$ will now be described. FIG. 9 is a characteristic diagram illustrating a relationship between the relative position and the first and second magnetic field components MF1 and MF2. In FIG. 9, the horizontal axis represents the relative position, and the vertical axis the magnitudes of the magnetic flux densities corresponding to the strength of the first and second magnetic field components MF1 and MF2. In FIG. 9, the reference numeral 71 denotes the magnetic flux density corresponding to the strength of the first magnetic field component MF1. The reference numeral 72 denotes the magnetic flux density corresponding to the strength of the second magnetic field component MF2. As illustrated in FIG. 9, when the relative position varies, the magnetic flux density 71 corresponding to the strength of the first magnetic field component MF1 does not vary but the magnetic flux density 72 corresponding to the strength of the second magnetic field component MF2 varies.

Figure 10:
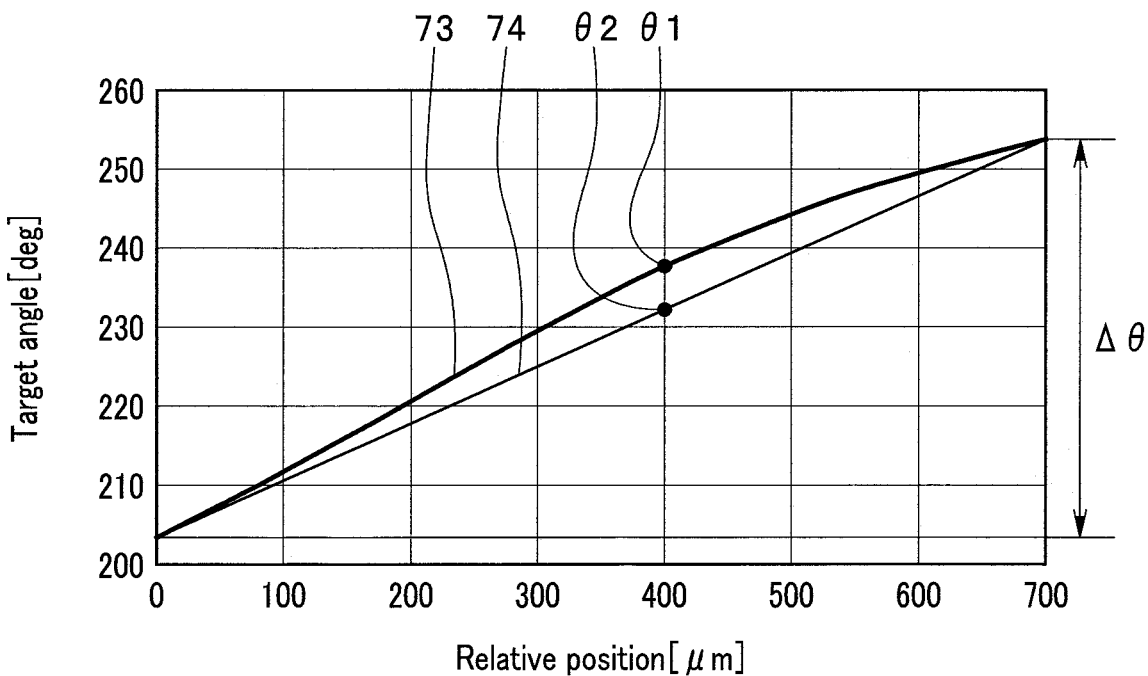
FIG. 10 is a characteristic diagram illustrating the relationship between a relative position and a target angle in the first embodiment of the invention.

FIG. 10 is a characteristic diagram illustrating the relationship between the relative position and the target angle $\theta$. In FIG. 10, the horizontal axis represents the relative position, and the vertical axis represents the target angle $\theta$. In FIG. 10, the reference numeral 73 denotes a curve expressing the relationship between the relative position and the target angle $\theta$. The reference numeral 74 denotes a line segment connecting both ends of the curve denoted by the reference numeral 73.

Now, a mode of variation of the target angle $\theta$ relative to variations in the relative position will be discussed. In the present embodiment, in a characteristic diagram expressing a relationship between two parameters like FIG. 10, a mode of variation where one parameter varies linearly or substantially linearly relative to variations in the other parameter will be referred to as "varying linearly". In the characteristic diagram expressing the relationship between two parameters, a mode of variation where one parameter does not vary linearly or substantially linearly relative to the other parameter, like varying in a curved manner, will be referred to as "varying nonlinearly".

In FIG. 10, the target angle $\theta$ varies in a curved manner relative to variations in the relative position. In other words, in FIG. 10, the target angle $\theta$ varies nonlinearly relative to variations in the relative position. The target angle $\theta$ varies within a first variable range corresponding to the movable range of the relative position.

In the present embodiment, the magnetic field generator 10 is configured so that a mode of variation of the direction of the target magnetic field MF relative to variations in the relative position is such that the direction of the target magnetic field MF varies nonlinearly relative to variations in the relative position. In other words, the magnetic field generator 10 is configured so that a mode of variation of the target angle $\theta$ relative to variations in the relative position is such that the target angle $\theta$ varies nonlinearly relative to variations in the relative position. Whether the target angle $\theta$ varies linearly or nonlinearly is determined, for example, by the strength of the first and second magnetic field components MF1 and MF2 within the movable range of the relative position. The strength of the first and second magnetic field components MF1 and MF2 can be adjusted by the positions, characteristics, and other factors of the magnets 13, 31A, and 34A.

For example, the magnetic field generator 10 can be configured so that the target angle $\theta$ varies nonlinearly, on the basis of a first linearity parameter to be described below. In an orthogonal coordinate system where the position of the lens 5 and the target angle $\theta$ are represented by two orthogonal axes, a curve expressing a relationship between the position of the lens 5 and the target angle $\theta$ within the movable range of the lens 5 will be referred to as a first curve. A line segment connecting both ends of the first curve will be referred to as a first line segment. As described above, the relative position indicates the position of the lens 5. If the movable range of the relative position is 0 to 700 µm, the curve denoted by the reference numeral 73 in FIG. 10 corresponds to the first curve, and the line segment denoted by the reference numeral 74 in FIG. 10 corresponds to the first line segment. The value of the target angle θ corresponding to a given relative position will be referred to as a first value θ1. The value corresponding to the given relative position on the first line segment will be referred to as a second value θ2. FIG. 10 illustrates examples of the first and second values θ1 and θ2.

A difference between the maximum and minimum values of the target angle θ within the first variable range of the target angle θ will be referred to as a third value Δθ. FIG. 10 illustrates a third value Δθ in the case where the movable range of the relative position is 0 to 700 µm. The ratio of the difference between the first and second values θ1 and θ2 to the third value Δθ will be referred to as a first linearity parameter L1. The first linearity parameter L1 (in units of %) is expressed by the following Eq. (1):

$$L1=(\theta 1-\theta 2)/\Delta\theta \times 100 \qquad (1)$$

The smaller the absolute value of the first linearity parameter L1, the more linearly the target angle θ varies relative to variations in the relative position. If the absolute value of the first linearity parameter L1 is less than 3%, the target angle θ can be said to vary linearly or substantially linearly relative to variations in the relative position. In the present embodiment, the magnetic field generator 10, i.e., the first and second magnetic field generation units 11 and 12 are preferably configured to set the absolute value of the first linearity parameter L1 to 3% or more, more preferably 10% or more, so that the target angle θ varies nonlinearly. In the example illustrated in FIG. 10, the absolute value of the first linearity parameter L1 is 11%.

On the other hand, if the absolute value of the first linearity parameter L1 is too large, a variation in the target angle θ becomes so large or so small compared to a variation in the relative position that the position of the lens 5 can no longer be accurately detected. To avoid this, the magnetic field generator 10, i.e., the first and second magnetic field generation units 11 and 12 are preferably configured so that the absolute value of the first linearity parameter L1 is 100% or less.

Next, a relationship between the relative position, the target angle θ, and the detection signal will be described. As describe above, an MR element 50 has a minimum resistance value when the angle that the second magnetization direction of the free layer 51 forms with the first magnetization direction of the magnetization pinned layer 53 is 0°, and a maximum resistance value when the angle is 180°. In each of the plurality of MR elements 50 included in the first resistor section R1, the angle that the second magnetization direction of the free layer 51 forms with the first direction that is the first magnetization direction of the magnetization pinned layer 53 will be referred to as a relative angle. The second magnetization direction of the free layer 51 varies with the direction of the target magnetic field MF. The relative angle thus varies with the direction of the target magnetic field MF and the target angle θ.

The first magnetization direction of the magnetization pinned layer in each of the plurality of MR elements 50 included in the fourth resistor section R4 is the same direction (first direction) as the first magnetization direction of the magnetization pinned layer 53 in each of the plurality of MR elements 50 included in the first resistor section R1.

In each of the plurality of MR elements 50 included in the fourth resistor section R4, the angle that the second magnetization direction of the free layer 51 forms with the first magnetization direction of the magnetization pinned layer 53 is therefore the same or substantially the same as the relative angle.

The first magnetization direction of the magnetization pinned layer 53 in each of the plurality of MR elements 50 included in the second resistor section R2 is opposite direction (second direction) to the first magnetization direction of the magnetization pinned layer 53 in each of the plurality of MR element 50 included in the first resistor section R1. In each of the plurality of MR elements 50 included in the second resistor section R2, the angle that the second magnetization direction of the free layer 51 forms with the first magnetization direction of the magnetization pinned layer 53 is therefore approximately 180° different from the relative angle.

The first magnetization direction of the magnetization pinned layer 53 in each of the plurality of MR elements 50 included in the third resistor section R3 is the same direction (second direction) as the first magnetization direction of the magnetization pinned layer 53 in each of the plurality of MR element 50 included in the second resistor section R2. In each of the plurality of MR elements 50 included in the third resistor section R3, the angle that the second magnetization direction of the free layer 51 forms with the first magnetization direction of the magnetization pinned layer 53 is therefore approximately 180° different from the relative angle.

In the present embodiment, the second magnetization direction of the free layer 51 coincides with the direction of the target magnetic field MF. The angle that the first direction forms with the X direction will be referred to as a first angle. The relative angle is obtained by subtracting the first angle from the target angle θ.

Figure 11:
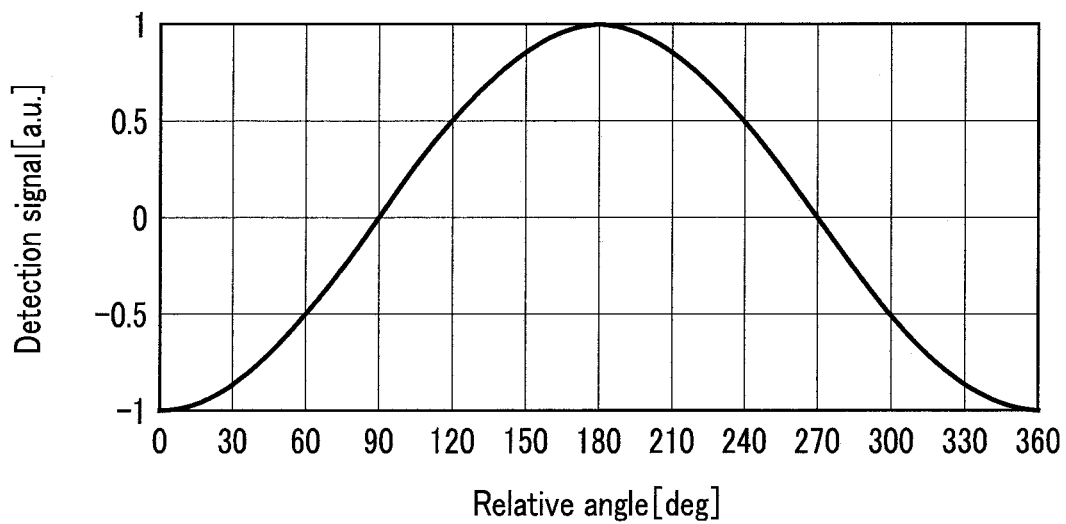
FIG. 11 is a characteristic diagram illustrating the relationship between a relative position and a detection signal in the first embodiment of the invention.

The magnetic sensor 20 is configured, for example, so that the detection signal has a minimum value when the relative angle is 0°, and a maximum value when the relative angle is 180°. FIG. 11 is a characteristic diagram illustrating the relationship between the relative angle and the detection signal. In FIG. 11, the horizontal axis represents the relative angle, and the vertical axis the detection signal. In FIG. 11, the detection signal is normalized so that the detection signal has a maximum value of 1 and a minimum value of −1.

In the present embodiment, the detection signal varies within a second variable range corresponding to the first variable range of the target angle θ. The magnetic sensor 20 is configured so that the mode of variation of the detection signal relative to variations in the relative angle is such that the detection signal varies nonlinearly relative to the variations in the direction of the target magnetic field MF. In particular, in the present embodiment, the magnetic sensor 20 is configured so that the mode of variation of the detection signal relative to variations in the direction of the target magnetic field MF is such that the detection signal varies nonlinearly relative to the variations in the direction of the target magnetic field MF. In other words, the magnetic sensor 20 is configured so that the mode of variation of the detection signal relative to variations in the target angle θ is such that the detection signal varies nonlinearly relative to variations in the target angle θ.

As can be seen from FIG. 11, whether the detection signal varies linearly or nonlinearly is determined by the range of the relative angle. The range of the relative angle is determined by the first variable range of the target angle θ and the first angle that the first direction forms with the X direction.

The range of the relative angle can thus be adjusted by the first magnetization direction of the magnetization pinned layer 53.

Figure 12:
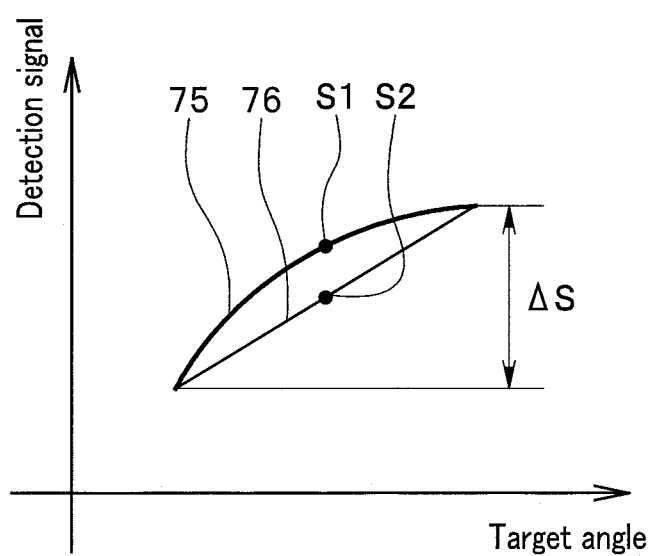
FIG. 12 is a schematic diagram illustrating the relationship between the target angle and the detection signal in the first embodiment of the invention.

For example, the magnetic sensor 20 can be configured so that the detection signal varies nonlinearly, on the basis of a second linearity parameter to be described below. In an orthogonal coordinate system where the target angle θ and the detection signal are represented by two orthogonal axes, a curve expressing a relationship between the target angle θ and the detection signal within the first variable range of the target angle θ will be referred to as a second curve. A line segment connecting both ends of the second curve will be referred to as a second line segment. FIG. 12 is a schematic diagram illustrating a relationship between the target angle θ and the detection signal. In FIG. 12, the horizontal axis represents the target angle θ, and the vertical axis the detection signal. In FIG. 12, the curve denoted by the reference numeral 75 represents the second curve. The line segment denoted by the reference numeral 76 represents the second line segment. The value of the detection signal corresponding to a given target angle θ will be referred to as a fourth value S1. The value corresponding to the given target angle θ on the second line segment will be referred to as a fifth value S2. FIG. 12 illustrates examples of the fourth and fifth values S1 and S2.

A difference between the maximum and minimum values of the detection signal within the second variable range of the detection signal will be referred to as a sixth value ΔS. The ratio of the difference between the fourth and fifth values S1 and S2 to the sixth value ΔS will be referred to as a second linearity parameter L2. The second linearity parameter L2 (in units of %) is expressed by the following Eq. (2):

$$L2=(S1-S2)/\Delta S \times 100 \quad (2)$$

The smaller the absolute value of the second linearity parameter L2, the more linearly the detection signal varies relative to variations in the target angle θ. If the absolute value of the second linearity parameter L2 is less than 3%, the detection signal can be said to vary linearly or substantially linearly relative to variations in the target angle θ. In the present embodiment, the magnetic sensor 20, i.e., the first magnetization direction of the magnetization pinned layer 53 is preferably configured to set the absolute value of the second linearity parameter L2 to 3% or more, more preferably 10% or more, so that the detection signal varies nonlinearly.

On the other hand, if the absolute value of the second linearity parameter L2 is too large, a variation in the detection signal becomes so large or so small compared to a variation in the target angle θ that the position of the lens 5 can no longer be accurately detected. To avoid this, the first magnetization direction of the magnetic sensor 20, i.e., the magnetization pinned layers 53 is preferably configured so that the absolute value of the second linearity parameter L2 is 100% or less.

In particular, in the present embodiment, the magnetic sensor 20 includes the plurality of MR elements 50. In such a case, the magnetic sensor 20 can be configured so that the detection signal varies nonlinearly on the basis of the relative angle. The relative angle can be used instead of or in combination with the second linearity parameter L2.

Specifically, the magnetic sensor 20, i.e., the plurality of MR elements 50 are each configured so that the relative angle when the lens 5 is located at the center of the movable range falls within the range of 0° or more and 70° or less, within the range of 110° or more and 250° or less, or within the range of 290° or more and less than 360°. The relative angle when the lens 5 is located at the center of the movable range more preferably falls within the range of 10° or more and 60° or less, within the range of 120° or more and 170° or less, within the range of 190° or more and 240° or less, or within the range of 300° or more and 350° or less. As can be seen from FIG. 12, the detection signal varies nonlinearly relative to variations in the relative angle within such ranges.

As described above, the relative angle refers to the angle that the second magnetization direction of the free layer 51 forms with the first direction that is the first magnetization direction of the magnetization pinned layer 53 in each of the plurality of MR elements 50 included in the first and fourth resistor sections R1 and R4. Now, in each of the plurality of MR elements 50 included in the second and third resistor sections R2 and R3, the angle that the second magnetization direction of the free layer 51 forms with the second direction that is the first magnetization direction of the magnetization pinned layer 53 will be referred to as a second angle. For example, if the relative angle when the lens 5 is located at the center of the movable range is in the range of 180° or more and 250° or less, the second angle when the lens 5 is located at the center of the movable range falls within the range of 0° or more and 70° or less. If the relative angle when the lens 5 is located at the center of the movable range is in the range of 290° or more and less than 360°, the second angle when the lens 5 is located at the center of the movable range falls within the range of 110° or more and 180° or less.

As described above, in the present embodiment, the magnetic field generator 10 is configured so that the mode of variation of the direction of the target magnetic field MF relative to variations in the position of the lens 5 is such that the direction of the target magnetic field MF varies nonlinearly relative to the variations in the position of the lens 5. In addition, the magnetic sensor 20 is configured so that the mode of variation of the detection signal relative to variations in the direction of the target magnetic field MF is such that the detection signal varies nonlinearly relative to the variations in the direction of the target magnetic field MF. According to the present embodiment, the detection signal can thereby be made to vary linearly relative to variations in the position of the lens 5. In other words, according to the present embodiment, the detection signal can vary linearly relative to variations in the position of the lens 5 even if the direction of the target magnetic field MF varies nonlinearly relative to the variations in the position of the lens 5.

An effect of the position detection device 1 according to the present embodiment will be described below in comparison with a position detection device according to a first comparative example. A configuration of the position detection device according to the first comparative example will initially be described. The position detection device according to the first comparative example has basically the same configuration as that of the position detection device 1 according to the present embodiment. In the first comparative example, the relative angle when the lens 5 is located at the center of the movable range is 90°.

Next, a configuration of a position detection device according to a first practical example corresponding to the position detection device 1 according to the present embodiment will be described. The position detection device according to the first practical example has basically the same configuration as that of the position detection device 1 according to the present embodiment. In the first practical example, the relative angle when the lens 5 is located at the center of the movable range is 127°.

Figure 13:
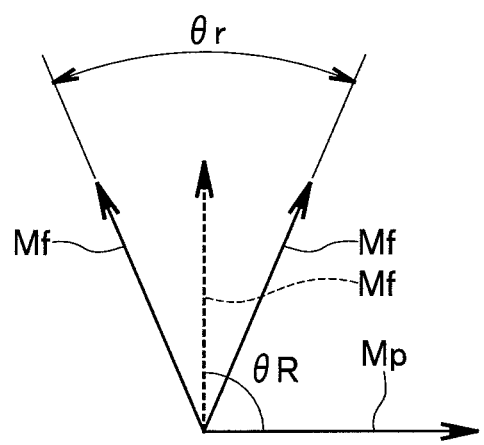
FIG. 13 is an explanatory diagram illustrating first and second magnetization directions (directions of first and second magnetizations) in a position detection device according to a first comparative example.
Figure 14:
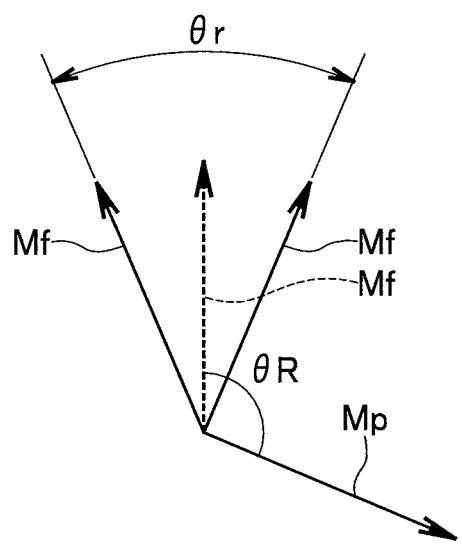
FIG. 14 is an explanatory diagram illustrating first and second magnetization directions in a position detection device according to a first practical example.

FIG. 13 is an explanatory diagram illustrating the first and second magnetization directions in the position detection device according to the first comparative example. FIG. 14 is an explanatory diagram illustrating the first and second magnetization directions in the position detection device according to the first practical example. FIGS. 13 and 14 illustrate the first and second magnetization directions of each of the plurality of MR elements 50 included in the first and fourth resistor sections R1 and R4. In FIGS. 13 and 14, the arrow denoted by the symbol Mp represents the first magnetization direction (first direction) of the magnetization pinned layer 53. The arrows denoted by the symbol Mf represent the second magnetization direction of the free layer 51. In FIGS. 13 and 14, the arrow denoted by the symbol Or indicates the variable range of the first magnetization direction corresponding to the movable range of the lens 5. The broken-lined arrow denoted by the symbol Mf represents the first magnetization direction when the lens 5 is located at the center of the movable range.

Figure 15:
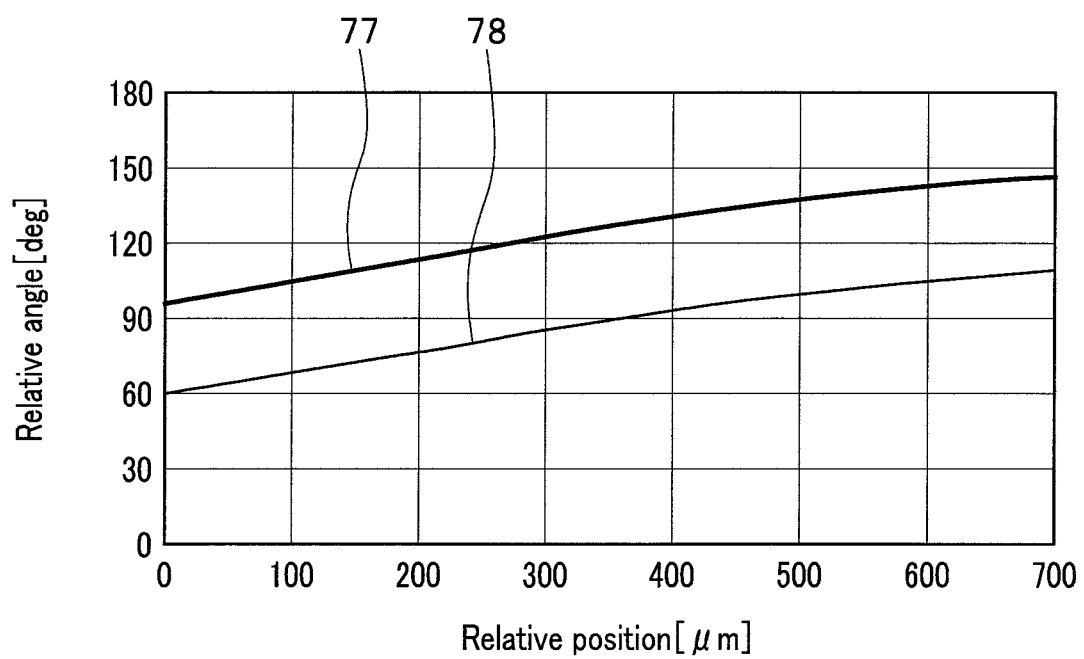
FIG. 15 is a characteristic diagram illustrating a relationship between a relative position and a relative angle in each of the position detection device according to the first comparative example and the position detection device according to the first practical example.

FIG. 15 is a characteristic diagram illustrating a relationship between the relative position and the relative angle. In FIG. 15, the horizontal axis represents the relative position, and the vertical axis the relative angle. In FIG. 15, the reference numeral 77 denotes the relative angle according to the first practical example, and the reference numeral 78 the relative angle according to the first comparative example. In the first comparative example and the first practical example, the movable range of the relative position is 0 to 700 μm.

Now, a third linearity parameter L3 will be defined as a parameter representing the mode of variation of the detection signal relative to variations in the position of the lens 5, i.e., variations in the relative position. The definition of the third linearity parameter L3 is basically the same as that of the second linearity parameter L2 described with reference to FIG. 12. The definition of the third linearity parameter L3 is given by replacing the target angle θ and the first variable range in the description of the definition of the second linearity parameter L2 with the relative position and the movable range, respectively. The smaller the absolute value of the third linearity parameter L3, the more linearly the detection signal varies relative to variations in the relative position.

Figure 16:
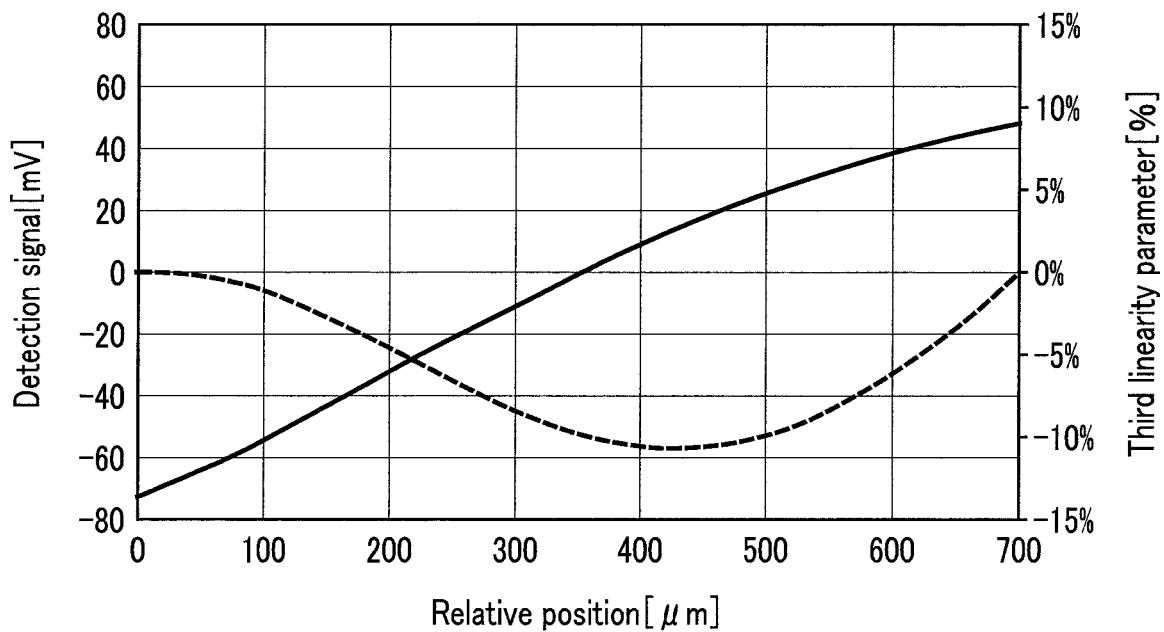
FIG. 16 is a characteristic diagram illustrating a relationship between the relative position and a detection signal, and between the relative position and a third linearity parameter of the position detection device according to the first comparative example.
Figure 17:
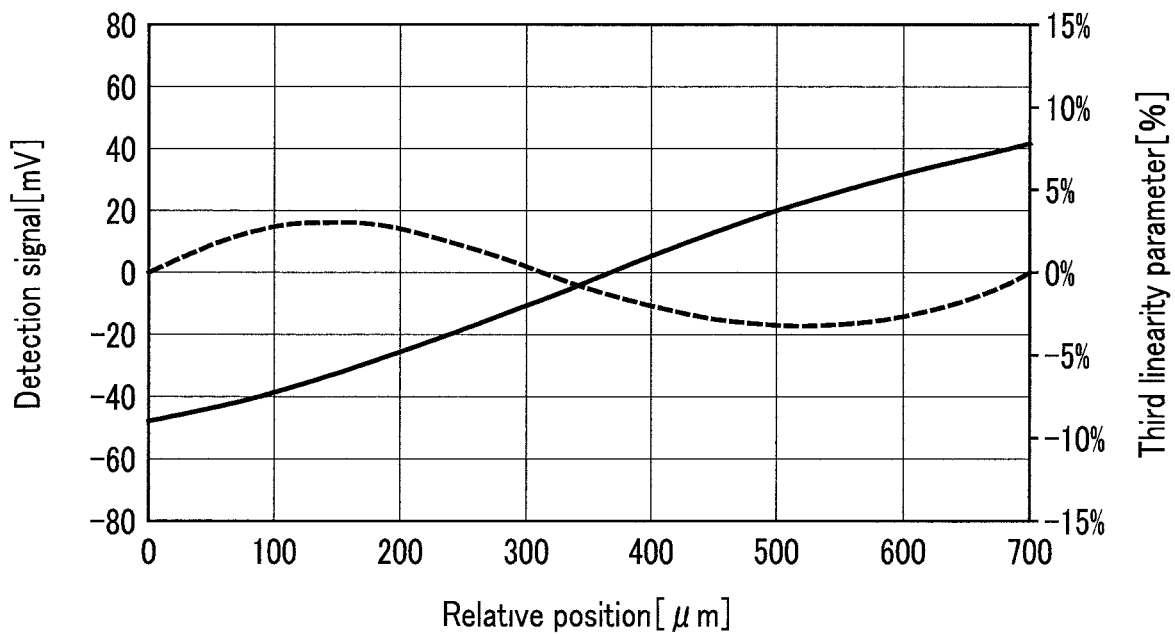
FIG. 17 is a characteristic diagram illustrating a relationship between the relative position and a detection signal, and between the relative position and a third linearity parameter of the position detection device according to the first practical example.

FIG. 16 is a characteristic diagram illustrating a relationship between the relative position and the detection signal, and between the relative position and the third linearity parameter L3 of the position detection device according to the first comparative example. FIG. 17 is a characteristic diagram illustrating a relationship between the relative position and the detection signal, and between the relative position and the third linearity parameter L3 of the position detection device according to the first practical example. In FIGS. 16 and 17, the horizontal axis represents the relative position. The vertical axis on the left represents the detection signal, and the vertical axis on the right the third linearity parameter L3. In FIGS. 16 and 17, a solid-lined curve represents the detection signal, and a broken-lined curve the third linearity parameter L3.

As illustrated in FIG. 16, in the first comparative example, the maximum absolute value of the third linearity parameter L3 was 11%. As illustrated in FIG. 17, in the first practical example, the maximum absolute value of the third linearity parameter L3 was 3%. As can be seen from FIGS. 16 and 17, according to the present embodiment, the detection signal can vary linearly relative to variations in the relative position, i.e., variations in the position of the lens 5, compared to the first comparative example.

Next, other effects of the present embodiment will be described. In the present embodiment, the relative angle when the lens 5 is located at the center of the movable range is set to within the range of 0° or more and 70° or less, within the range of 110° or more and 250° or less, or within the range of 290° or more and less than 360°. If the relative angle is 0° or in its vicinity, or 180° or in its vicinity, a variation in the detection signal becomes small compared to a variation in the relative angle. By setting the relative angle to any one of the foregoing preferable ranges to exclude a relative angle of 0° and its vicinity, or a relative angle of 180° and its vicinity, a variation in the detection signal can be prevented from becoming small compared to a variation in the relative angle.

Figure 18:
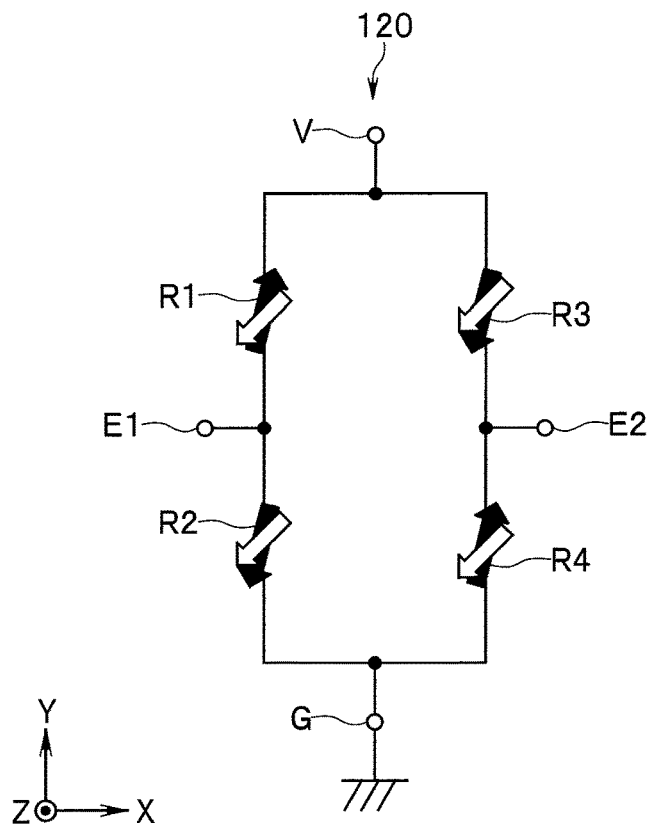
FIG. 18 is a circuit diagram illustrating a configuration of a magnetic sensor in a position detection device according to a second comparative example.

In the present embodiment, the magnetic sensor 20 includes the first and second resistors Ro1 and Ro2. According to the present embodiment, the offset of the detection signal can thereby be reduced. This effect will be described below in comparison with a position detection device according to a second comparative example. A configuration of the position detection device according to the second comparative example will initially be described. The position detection device according to the second comparative example includes a magnetic sensor 120 instead of the magnetic sensor 20 of the present embodiment. FIG. 18 is a circuit diagram illustrating a configuration of the magnetic sensor 120. The magnetic sensor 120 does not include the first and second resistor Ro1 and Ro2 of the present embodiment. The rest of the configuration of the position detection device according to the second comparative example is the same as that of the position detection device 1 according to the present embodiment.

Figure 19:
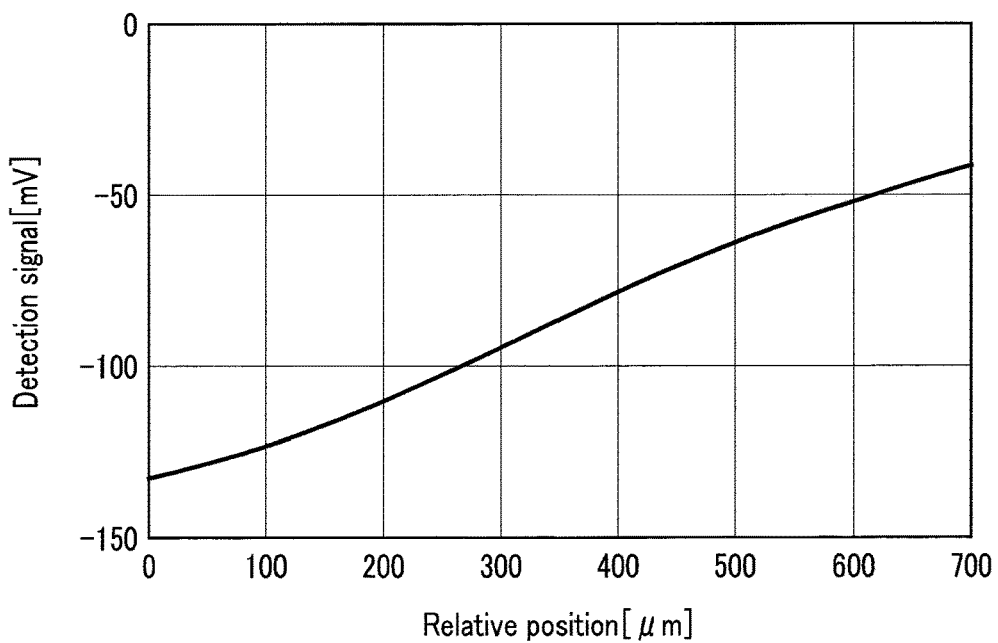
FIG. 19 is a characteristic diagram illustrating a relationship between a relative position and a detection signal in the position detection device according to the second comparative example.

FIG. 19 is a characteristic diagram illustrating a relationship between the relative position and the detection signal of the position detection device according to the second comparative example. In FIG. 19, the horizontal axis represents the relative position, and the vertical axis the detection signal. As illustrated in FIG. 19, in the second comparative example, the detection signal is weak compared to the detection signal according to the first practical example illustrated in FIG. 17. A deviation of the detection signal when the lens 5 is located at the center of the movable range from a predetermined reference value will hereinafter be referred to as an offset of the detection signal, or simply as an offset. An example of the predetermined reference value is 0. FIG. 19 illustrates that in the second comparative example, the detection signal has an offset greater than that of the detection signal according to the first practical example.

For example, the detection signal is input to a non-illustrated processor and given predetermined processing. The non-illustrated processor includes, for example, an application specific integrated circuit (ASIC) or microcomputer, and includes an analog-to-digital converter (hereinafter, referred to as an A/D converter) for converting the detection signal into a digital signal. The use range of the detection signal in the non-illustrated processor is defined in advance. For example, the use range is the range of normal input signals to the A/D converter. As illustrated in FIG. 19, if the offset of the detection signal is large, the value of the detection signal can go out of the use range even within the second variable range. In such a case, the position of the lens 5 is unable to be detected.

As illustrated in FIG. 11, the detection signal is 0 when the relative angle is 90° or 270°. As describe above, the reason why the detection signal has a large offset is that the relative angle when the lens 5 is located at the center of the movable range is other than 90° or 270°. By contrast, in the present embodiment, the offset of the detection signal is reduced by adjusting the potentials of the output ports E1 and E2 with the first and second resistors Ro1 and Ro2. According to the present embodiment, the value of the detection signal can thereby be prevented from going out of the use range.

Second Embodiment

Figure 20:
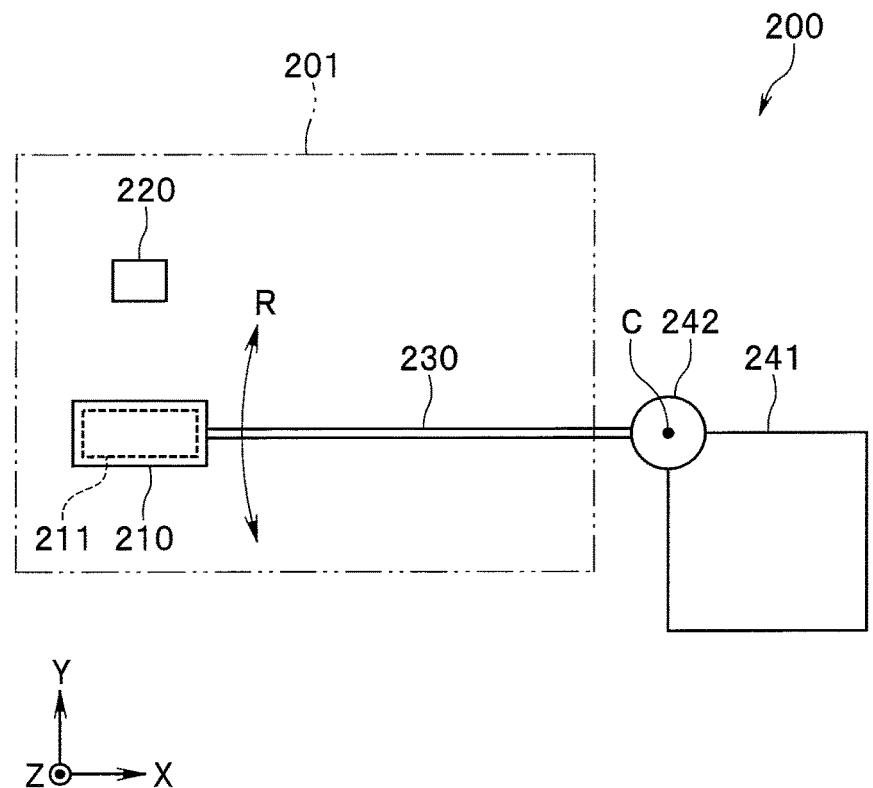
FIG. 20 is a plan view illustrating a rotary actuator according to a second embodiment of the present invention.

A second embodiment of the invention will now be described. A configuration of a rotary actuator according to the second embodiment of the present invention will initially be described with reference to FIG. 20. FIG. 20 is a plan view illustrating a rotary actuator 200.

The rotary actuator 200 according to the present embodiment includes a position detection device 201 according to the present embodiment, a main body 241, and a rotating body 242. The position detection device 201 according to the present embodiment is a magnetic position detection device and used to detect the rotational position of the rotating body 242. The main body 241 includes a non-illustrated driving device including a servo motor, for example. The non-illustrated driving device rotates the rotating body 242 in a direction of rotation R about a predetermined rotation axis C. The non-illustrated driving device is controlled by a non-illustrated control unit outside the rotary actuator 200.

FIG. 20 illustrates an X direction, a Y direction, and a Z direction like FIGS. 6 and 7 in the first embodiment. In the present embodiment, a direction that is parallel to the rotation axis C and directed from the far side to the near side of FIG. 20 is defined as the Z direction. In FIG. 20, the X direction is illustrated as a rightward direction, and the Y direction an upward direction.

The position detection device 201 includes a magnetic field generator 210, a magnetic sensor 220, and a connection member 230. The connection member 230 connects the magnetic field generator 210 to the rotating body 242. As the rotating body 242 rotates, the position of the magnetic field generator 210 varies in the direction of rotation R about the rotation axis C. The magnetic field generator 210 generates a target magnetic field that is the magnetic field for the magnetic sensor 220 to detect (magnetic field to be detected). In the present embodiment, the magnetic field generator 210 includes a magnet 211 for generating the target magnetic field.

The magnetic sensor 220 detects the target magnetic field at a detection position in a reference plane, and generates a detection signal corresponding to the direction of the target magnetic field. The magnetic sensor 220 is fixed to near the magnetic field generator 210 by a non-illustrated fixing member. The detection position refers to a position where the magnetic sensor 220 detects the target magnetic field. The reference plane is a plane that includes the detection position and is perpendicular to the Z direction. The magnetic sensor 220 has the same configuration as that of the magnetic sensor 20 of the first embodiment.

The magnetic field generator 210 is configured so that the direction and strength of the target magnetic field at the detection position in the reference plane vary when the rotational position of the rotating body 242 varies. When the position of the magnetic field generator 210 varies with a variation in the rotational position of the rotating body 242, the direction and strength of the target magnetic field at the detection position varies and the value of the detection signal generated by the magnetic sensor 220 varies accordingly. The value of the detection signal varies depending on the rotational position of the rotating body 242. The non-illustrated control unit detects the rotational position of the rotating body 242 by measuring the detection signal. Like the magnetic sensor 20 of the first embodiment, the magnetic sensor 220 generates the detection signal corresponding to a target angle that the direction of the target magnetic field forms with a reference direction.

The rotational position of the rotating body 242 will hereinafter be referred to simply as a rotational position. In the present embodiment, the rotational position is expressed by the rotation angle of the rotating body 242. The rotational position (rotation angle) when the rotating body 242 is located at the center of the movable range is 0°. The rotational position is expressed in positive angle values if the rotating body 242 is rotated in one direction along the direction of rotation R from the state where the rotation position is 0°. The rotation position is expressed in negative angle values if the rotating body 242 is rotated in a direction opposite to the foregoing one direction along the direction of rotation R from the state where the rotation position is 0°. The movable range of the rotational position is less than 90°, for example.

Figure 21:
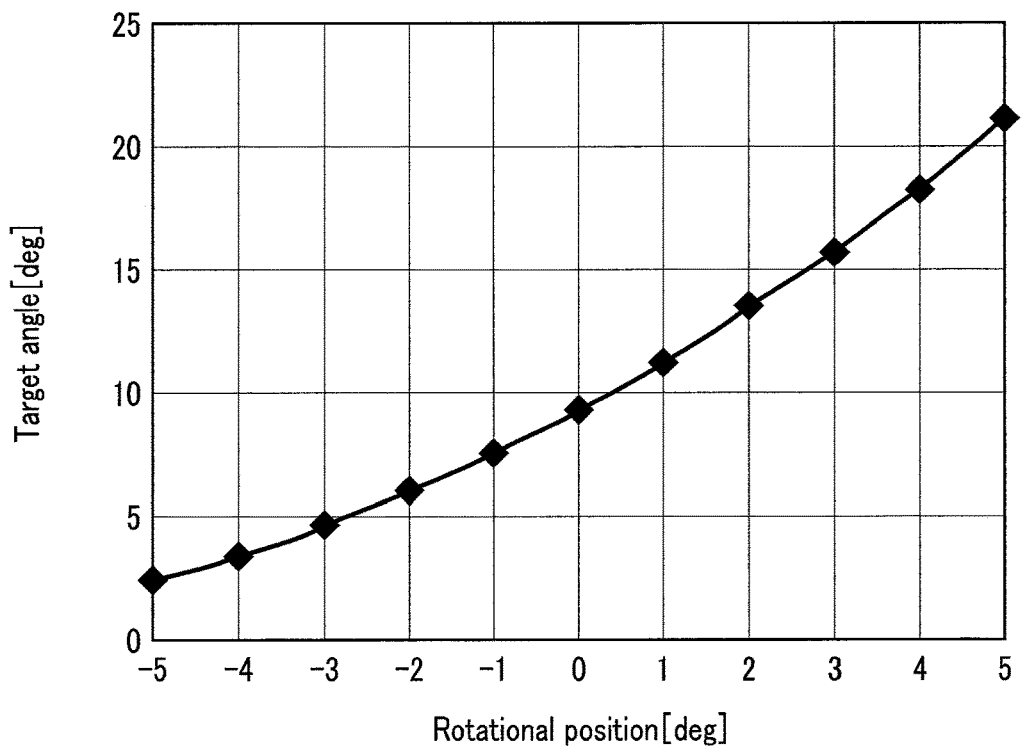
FIG. 21 is a characteristic diagram illustrating a relationship between a rotational position and a target angle according to the second embodiment of the present invention.

FIG. 21 is a characteristic diagram illustrating a relationship between the rotational position and the target angle. In FIG. 21, the horizontal axis represents the rotational position, and the vertical axis the target angle. In FIG. 21, the target angle varies in a curved manner relative to variations in the rotational position. In FIG. 21, the target angle thus varies nonlinearly relative to variations in the rotational position. The target angle varies within a first variable range corresponding to the movable range of the rotational position.

In the present embodiment, the magnetic field generator 210 is configured so that the mode of variation of the direction of the target magnetic field relative to variations in the rotational position is such that the direction of the target magnetic field varies nonlinearly relative to variations in the rotation position. In other words, the magnetic field generator 210 is configured so that the mode of variation of the target angle relative to variations in the rotation position is such that the target angle varies nonlinearly relative to variations in the rotation position. Whether the target angle varies linearly or nonlinearly is determined, for example, by the magnetization direction of the magnet 211 in the magnetic field generator 210 and the position of the magnetic field generator 210 relative to the magnetic sensor 220.

The magnetic field generator 210 can be configured so that the target angle varies nonlinearly, for example, on the basis of the first linearity parameter L1 described in the first embodiment. The first linearity parameter L1 of the present embodiment is defined in the following manner. Initially, in an orthogonal coordinate system where the rotational position and the target angle are represented by two orthogonal axes, a curve representing the relationship between the rotational position and the target angle within the movable range of the rotational position will be referred to as a first curve. A line segment connecting both ends of the first curve will be referred to as a first line segment. A value of the target angle corresponding to a given rotational position will be referred to as a first value $\theta 1$. A value corresponding to the given rotational position on the first line segment will be referred to as a second value $\theta 2$. A difference between the maximum and minimum values of the target angle within the first variable range of the target angle will be referred to as a third value $\Delta\theta$. The ratio of the difference between the first and second values $\theta 1$ and $\theta 2$ to the third value $\Delta\theta$ is defined as the first linearity parameter L1 corresponding to the first value $\theta 1$. The first linearity parameter L1 is expressed by Eq. (1) in the first embodiment.

In the present embodiment, the magnetic field generator 210 is configured so that the absolute value of the first linearity parameter L1 is 3% or more and 100% or less. Like the first embodiment, the magnetic field generator 210 is preferably configured so that the absolute value of the first linearity parameter L1 is 10% or more.

As described in the first embodiment, in each of the plurality of MR elements 50 (see FIG. 8) included in the first and fourth resistor sections R1 and R4 (see FIG. 7) of the magnetic sensor 220, the angle that the second magnetization direction of the free layer 51 forms with the first direction that is the first magnetization direction of the magnetization pinned layer 53 will be referred to as a relative angle. In the present embodiment, like the first embodiment, the second magnetization direction of the free layer 51 coincides with the direction of the target magnetic field MF.

The magnetic sensor 220 is configured so that the mode of variation of the detection signal relative to variations in the relative angle is such that the detection signal varies nonlinearly relative to the variations in the direction of the target magnetic field. In particular, in the present embodiment, the magnetic sensor 220 is configured so that the mode of variation of the detection signal relative to variations in the direction of the target magnetic field is such that the detection signal varies nonlinearly relative to the variations in the direction of the target magnetic field. In other words, the magnetic sensor 220 is configured so that the mode of variation of the detection signal relative to variations in the target angle θ is such that the detection signal varies nonlinearly relative to variations in the target angle.

As described in the first embodiment, whether the detection signal varies linearly or nonlinearly is determined by the range of the relative angle. The range of the relative angle can be adjusted by the first magnetization direction of the magnetization pinned layer 53.

The magnetic sensor 220 can be configured so that the detection signal varies nonlinearly, for example, on the basis of the second linearity parameter L2 described in the first embodiment. The definition of the second linearity parameter L2 in the present embodiment is the same as in the first embodiment. In the present embodiment, the first magnetization direction of the magnetic sensor 220, i.e., the magnetization pinned layers 53 is configured so that the absolute value of the second linearity parameter L2 is 3% or more and 100% or less. Like the first embodiment, the first magnetization direction of the magnetic sensor 220, i.e., the magnetization pinned layers 53 is preferably configured so that the absolute value of the second linearity parameter L2 is 10% or more.

In particular, in the present embodiment, the magnetic sensor 220 includes the plurality of MR elements 50. In such a case, the magnetic sensor 220 can be configured so that the detection signal varies nonlinearly on the basis of the relative angle. The relative angle can be used instead of or in combination with the second linearity parameter L2.

Specifically, the magnetic sensor 220, or each of the plurality of MR elements 50, is configured so that the relative angle when the rotating body 242 is located at the center of the movable range of the rotational position falls within the range of 0° or more and 70° or less, within the range of 110° or more and 250° or less, or within the range of 290° or more and less than 360°. The relative angle when the rotating body 242 is located at the center of the movable range of the rotational position is more preferably within the range of 10° or more and 60° or less, within the range of 120° or more and 170° or less, within the range of 190° or more and 240° or less, or within the range of 300° or more and 350° or less.

As described above, in the present embodiment, the magnetic field generator 210 is configured so that the mode of variation of the direction of the target magnetic field relative to variations in the rotational position of the rotating body 242 is such that the direction of the target magnetic field varies nonlinearly relative to the variations in rotational position of the rotating body 242. In addition, the magnetic sensor 220 is configured so that the mode of variation of the detection signal relative to variations in the direction of the target magnetic field is such that the detection signal varies nonlinearly relative to the variations in the direction of the target magnetic field. According to the present embodiment, the detection signal can thereby be made to vary linearly relative to variations in the rotational position of the rotating body 242. In other words, according to the present embodiment, the detection signal can vary linearly relative to variations in the rotational position of the rotating body 242 even if the direction of the target magnetic field varies nonlinearly relative to the variations in the rotational position of the rotating body 242.

An effect of the position detection device 201 according to the present embodiment will be described below in comparison with a position detection device according to a third comparative example. A configuration of the position detection device according to the third comparative example will initially be described. The position detection device according to the third comparative example has basically the same configuration as that of the position detection device 201 according to the present embodiment. In the third comparative example, the relative angle when the rotating body 242 is located at the center of the movable range is 90°. The third comparative example does not include the first and second resistor Ro1 and Ro2 (see FIG. 7).

Next, a configuration of a position detection device according to a second practical example will be described. The position detection device according to the second practical example has basically the same configuration as that of the position detection device 201 according to the present embodiment. In the second practical example, the relative angle when the rotating body 242 is located at the center of the movable range is 153°. The second practical example does not include the first and second resistor Ro1 and Ro2 (see FIG. 7).

In the present embodiment, the third linearity parameter L3 described in the first embodiment is used as a parameter representing the mode of variation of the detection signal relative to variations in the rotational position. The definition of the third linearity parameter L3 is basically the same as that of the second linearity parameter L2 described in the first embodiment. The definition of the third linearity parameter L3 of the present embodiment is given by replacing the target angle θ and the first variable range in the description of the definition of the second linearity parameter L2 with the relative position and the movable range, respectively. The smaller the absolute value of the third linearity parameter L3, the more linearly the detection signal varies relative to variations in the relative position.

Figure 22:
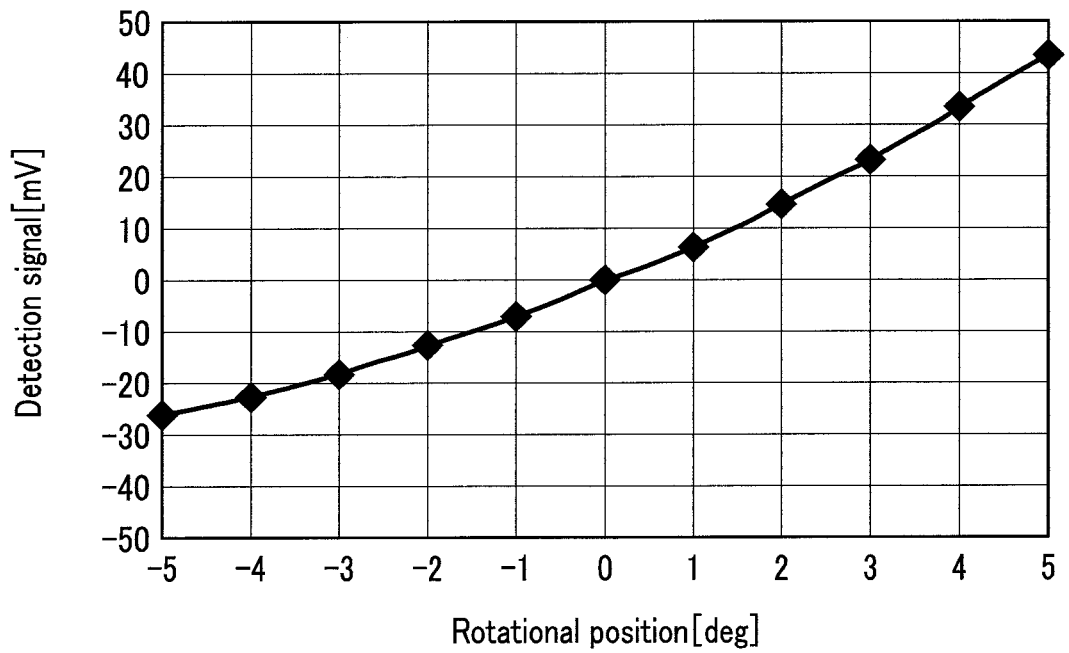
FIG. 22 is a characteristic diagram illustrating a relationship between a relative position and a detection signal in the position detection device according to a third comparative example.
Figure 23:
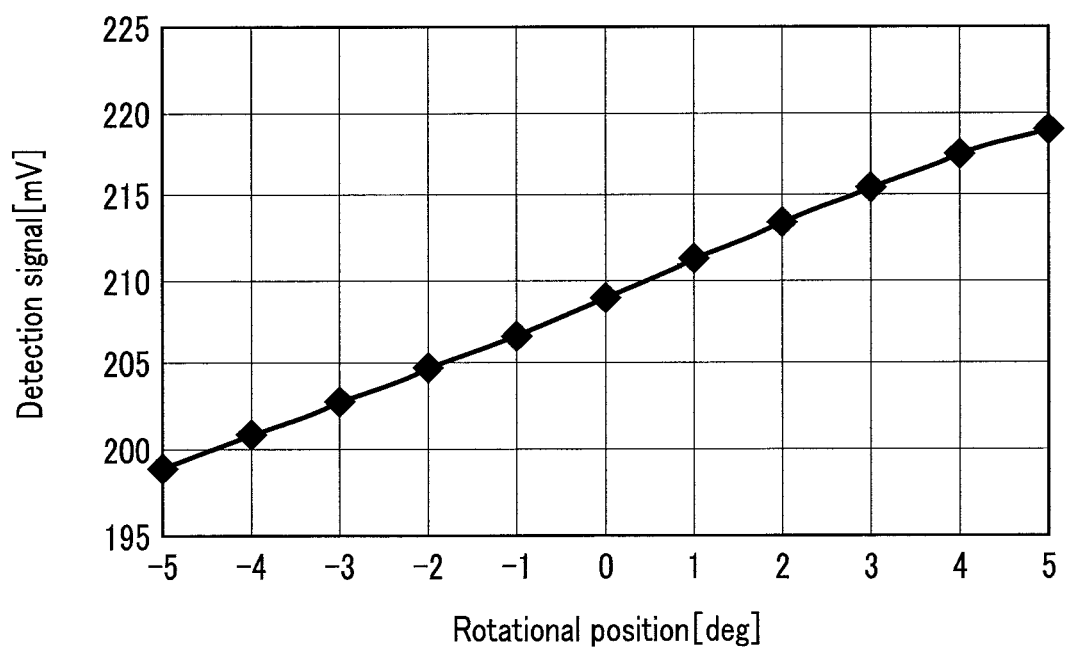
FIG. 23 is a characteristic diagram illustrating a relationship between a relative position and a detection signal in the position detection device according to a second practical example.

FIG. 22 is a characteristic diagram illustrating a relationship between the rotational position and the detection signal in the position detection device according to the third comparative example. FIG. 23 is a characteristic diagram illustrating a relationship between the rotational position and the detection signal in the position detection device according to the second practical example. In FIGS. 22 and 23, the horizontal axis represents the rotational position, and the vertical axis the detection signal. In the third comparative example and the second practical example, the movable range of the rotational position is −5° to 5°.

Figure 24:
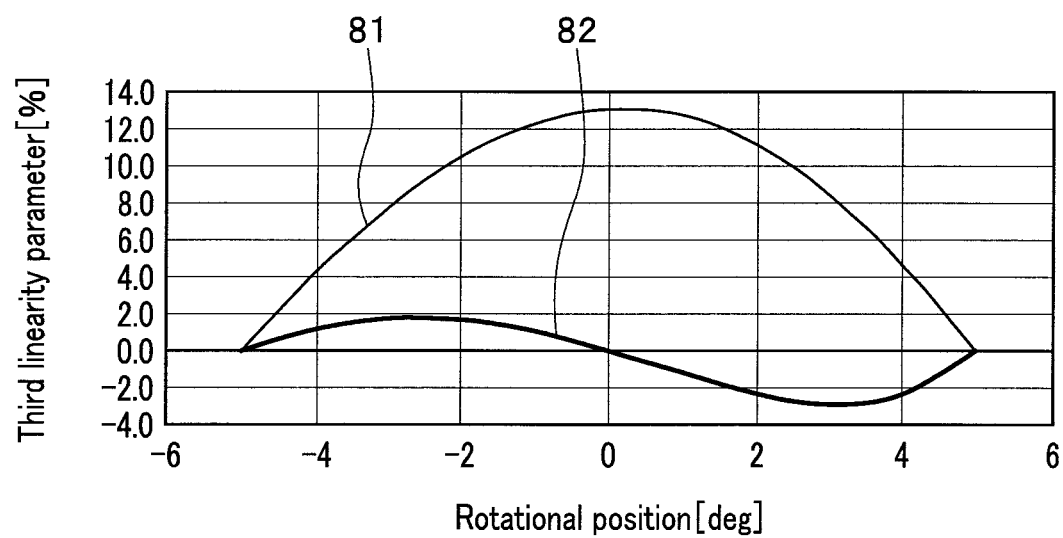
FIG. 24 is a characteristic diagram illustrating a relationship between a rotational position and a third linearity parameter in each of the position detection device according to the third comparative example and the position detection device according to the second practical example.

FIG. 24 is a characteristic diagram illustrating a relationship between the rotational position and the third linearity parameter L3. In FIG. 24, the horizontal axis represents the rotational position, and the vertical axis the third linearity parameter L3. In FIG. 24, the curve denoted by the reference numeral 81 represents the third linearity parameter L3 according to the third comparative example. The curve denoted by the reference numeral 82 represents the third linearity parameter L3 according to the second practical example. As illustrated in FIG. 24, in the third comparative example, the maximum absolute value of the third linearity parameter L3 was 13%. In the second practical example, the maximum absolute value of the third linearity parameter L3 was 3%. As can be seen from FIG. 24, according to the present embodiment, the detection signal can vary linearly relative to variations in the rotational position, compared to the third comparative example.

The configuration, operation and effects of the present embodiment are otherwise the same as those of the first embodiment.

The present invention is not limited to the foregoing embodiments, and various modifications may be made thereto. The configurations of the magnetic field generators 10 and 210 and the magnetic sensors 20 and 220 are not limited to the examples described in the embodiments, and any configuration may be employed as long as the requirements set forth in the claims are satisfied. For example, the magnetic sensors 20 and 220 may be configured to include the power supply port V, the ground port the first output port E1, the first resistor section R1, the second resistor section R2, and the first resistor Ro1, and include none of the second output port E2, the third resistor section R3, the fourth resistor section R4, and the second resistor Ro2. In such a case, the detection signal is a signal dependent on the electric potential at the first output port E1.

The first resistor Ro1 may be connected in series to the at least one second MR element so that the first resistor Ro1 is located between the first output port E1 and the ground port G In such a case, the second resistor Ro2 is connected in series to the at least one third MR element so that the second resistor Ro2 is located between the power supply port V and the second output port E2.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A position detection device for detecting a position of an object whose position is variable, the position detection device comprising:
a magnetic field generator that generates a target magnetic field and is configured so that a direction of the target magnetic field at a detection position in a reference plane varies when the position of the object varies; and
a magnetic sensor that detects the target magnetic field and generates a detection signal corresponding to the direction of the target magnetic field, wherein
the magnetic field generator is configured so that a mode of variation of the direction of the target magnetic field relative to variations in the position of the object varies nonlinearly relative to the variations in the position of the object, and
the magnetic sensor is configured so that a mode of variation of the detection signal relative to variations in the direction of the target magnetic field varies nonlinearly relative to the variations in the direction of the target magnetic field.

2. The position detection device according to claim 1, wherein:
a target angle that the direction of the target magnetic field forms with a reference direction in the reference plane varies within a first variable range corresponding to a movable range of the position of the object; and
the detection signal varies within a second variable range corresponding to the first variable range.

3. The position detection device according to claim 2, wherein:
the magnetic sensor includes at least one magnetoresistive element; and
the at least one magnetoresistive element each includes a magnetization pinned layer having a first magnetization that is parallel to the reference plane and fixed in direction, and a free layer having a second magnetization that is parallel to the reference plane and whose direction is variable according to the direction of the target magnetic field, the at least one magnetoresistive element each being configured so that an angle that the direction of the second magnetization forms with the direction of the first magnetization when the object is located at a center of the movable range falls within a range of 0° or more and 70° or less, within a range of 110° or more and 250° or less, or within a range of 290° or more and less than 360°.

4. The position detection device according to claim 3, wherein the at least one magnetoresistive element is each configured so that the angle that the direction of the second magnetization forms with the direction of the first magnetization when the object is located at the center of the movable range falls within a range of 10° or more and 60° or less, within a range of 120° or more and 170° or less, within a range of 190° or more and 240° or less, or within a range of 300° or more and 350° or less.

5. The position detection device according to claim 3, wherein:
the at least one magnetoresistive element includes at least one first magnetoresistive element and at least one second magnetoresistive element;
the magnetic sensor further includes a resistor having a predetermined resistance value, a power supply port to which a predetermined voltage is applied, a ground port that is connected to a ground, and an output port;
the at least one first magnetoresistive element is located between the power supply port and the output port;
the at least one second magnetoresistive element is located between the output port and the ground port;
the resistor is either connected in series to the at least one first magnetoresistive element so that the resistor is located between the power supply port and the output port, or connected in series to the at least one second magnetoresistive element so that the resistor is located between the output port and the ground port;
the direction of the first magnetization of the magnetization pinned layer in each of the at least one first magnetoresistive element is a first direction;

the direction of the first magnetization of the magnetization pinned layer in each of the at least one second magnetoresistive element is a second direction opposite to the first direction; and the detection signal depends on a potential of the output port.

6. The position detection device according to claim 3, wherein:

the at least one magnetoresistive element includes at least one first magnetoresistive element, at least one second magnetoresistive element, at least one third magnetoresistive element, and at least one fourth magnetoresistive element;

the magnetic sensor further includes a first resistor and a second resistor each having a predetermined resistance value, a power supply port to which a predetermined voltage is applied, a ground port that is connected to a ground, a first output port, and a second output port;

the at least one first magnetoresistive element is located between the power supply port and the first output port;

the at least one second magnetoresistive element is located between the first output port and the ground port;

the at least one third magnetoresistive element is located between the power supply port and the second output port;

the at least one fourth magnetoresistive element is located between the second output port and the ground port;

the first and second resistors are provided either such that the first resistor is connected in series to the at least one first magnetoresistive element so that the first resistor is located between the power supply port and the first output port and the second resistor is connected in series to the at least one fourth magnetoresistive element so that the second resistor is located between the second output port and the ground port, or such that the first resistor is connected in series to the at least one second magnetoresistive element so that the first resistor is located between the first output port and the ground port and the second resistor is connected in series to the at least one third magnetoresistive element so that the second resistor is located between the power supply port and the second output port;

the direction of the first magnetization of the magnetization pinned layer in each of the at least one first magnetoresistive element and the direction of the first magnetization of the magnetization pinned layer in each of the at least one fourth magnetoresistive element are a first direction;

the direction of the first magnetization of the magnetization pinned layer in each of the at least one second magnetoresistive element and the direction of the first magnetization of the magnetization pinned layer in each of the at least one third magnetoresistive element are a second direction opposite to the first direction; and the detection signal depends on a potential difference between the first and second output ports.

7. The position detection device according to claim 1, wherein the position of the object varies in a linear direction.

8. The position detection device according to claim 7, wherein:

the magnetic field generator includes a first magnetic field generation unit that generates a first magnetic field and a second magnetic field generation unit that generates a second magnetic field;

a position of the second magnetic field generation unit relative to the first magnetic field generation unit varies as the position of the object varies;

the first and second magnetic field generation units are configured so that a strength and a direction of a first magnetic field component and a direction of a second magnetic field component do not vary and a strength of the second magnetic field component varies as the position of the second magnetic field generation unit relative to the first magnetic field generation unit varies, the first magnetic field component being a component of the first magnetic field parallel to the reference plane at the detection position, the second magnetic field component being a component of the second magnetic field parallel to the reference plane at the detection position; and the target magnetic field is a composite of the first and second magnetic field components.

9. The position detection device according to claim 8, wherein the first magnetic field generation unit includes two magnets disposed at different positions, and the first magnetic field is a composite of two magnetic fields that are respectively generated by the two magnets.

10. The position detection device according to claim 8, further comprising a first holding member for holding the first magnetic field generation unit, and a second holding member for holding the second magnetic field generation unit, the second holding member being provided such that its position is variable in one direction relative to the first holding member.

11. The position detection device according to claim 10, wherein:

the object is a lens; and the second holding member holds the lens and is provided such that its position is variable in an optical axis direction of the lens relative to the first holding member.

12. The position detection device according to claim 1, wherein the object is a rotating body whose position is variable in a direction of rotation about a center axis.

13. The position detection device according to claim 12, wherein the magnetic field generator is connected to the rotating body.

14. A camera module comprising:

a lens whose position is variable in a linear direction;

a position detection device for detecting the position of the lens;

a holding member that holds the lens; and a driving device that moves the holding member, wherein the position detection device includes a magnetic field generator that generates a target magnetic field and is configured so that a direction of the target magnetic field at a detection position in a reference plane varies as the position of the lens varies, and a magnetic sensor that detects the target magnetic field and generates a detection signal corresponding to the direction of the target magnetic field, the magnetic field generator is configured so that a mode of variation of the direction of the target magnetic field relative to variations in the position of the lens varies nonlinearly relative to the variations in the position of the lens, and the magnetic sensor is configured so that a mode of variation of the detection signal relative to variations in the direction of the target magnetic field varies nonlinearly relative to the variations in the direction of the target magnetic field.

15. A rotary actuator comprising:

a rotating body whose position is variable in a direction of rotation about a center axis;

a position detection device for detecting the position of the rotating body; and a driving device that rotates the rotating body, wherein the position detection device includes a magnetic field generator that generates a target magnetic field and is configured so that a direction of the target magnetic field at a detection position in a reference plane varies as the position of the rotating body varies, and a magnetic sensor that detects the target magnetic field and generates a detection signal corresponding to the direction of the target magnetic field, the magnetic field generator is configured so that a mode of variation of the target magnetic field relative to variations in the position of the rotating body varies nonlinearly relative to the variations in the position of the rotating body, and the magnetic sensor is configured so that a mode of variation of the detection signal relative to variations in the direction of the target magnetic field varies nonlinearly relative to the variations in the direction of the target magnetic field.

* * * * *